United States Patent
Godet-Bar

(10) Patent No.: US 12,438,175 B2
(45) Date of Patent: Oct. 7, 2025

(54) AQUEOUS ORGANIC-BASED ELECTROLYTE FOR REDOX FLOW BATTERY

(71) Applicant: KEMIWATT, Rennes (FR)

(72) Inventor: Thibault Godet-Bar, Rennes (FR)

(73) Assignee: KEMIWATT, Rennes (FR)

( * ) Notice: Subject to any disclaimer, the term of this patent is extended or adjusted under 35 U.S.C. 154(b) by 587 days.

(21) Appl. No.: 17/787,759

(22) PCT Filed: Dec. 18, 2020

(86) PCT No.: PCT/EP2020/087256
§ 371 (c)(1),
(2) Date: Jun. 21, 2022

(87) PCT Pub. No.: WO2021/123334
PCT Pub. Date: Jun. 24, 2021

(65) Prior Publication Data
US 2023/0099857 A1   Mar. 30, 2023

(30) Foreign Application Priority Data

Dec. 20, 2019   (EP) ..................... 19306735

(51) Int. Cl.
*H01M 8/18* (2006.01)
*C07C 50/34* (2006.01)

(52) U.S. Cl.
CPC .......... *H01M 8/188* (2013.01); *C07C 50/34* (2013.01); *H01M 2300/0002* (2013.01)

(58) Field of Classification Search
CPC .......... H01M 8/188; H01M 2300/0002; C07C 50/34
See application file for complete search history.

(56) References Cited

U.S. PATENT DOCUMENTS

| | | | |
|---|---|---|---|
| 2015/0243991 A1* | 8/2015 | Huskinson | H01M 8/083 429/105 |
| 2016/0043423 A1* | 2/2016 | Huskinson | H01M 8/188 429/447 |

(Continued)

FOREIGN PATENT DOCUMENTS

| | | |
|---|---|---|
| CN | 107171012 | 9/2017 |
| WO | 2014/052682 | 4/2014 |

(Continued)

OTHER PUBLICATIONS

Chemistry of Natural Compounds, vol. 50, No. 2, May 2014 (Year: 2014).*

(Continued)

*Primary Examiner* — Alexander Usyatinsky
(74) *Attorney, Agent, or Firm* — NIXON & VANDERHYE

(57) ABSTRACT

Disclosed is an aqueous electrolyte for redox flow battery, including a compound of formula (I)

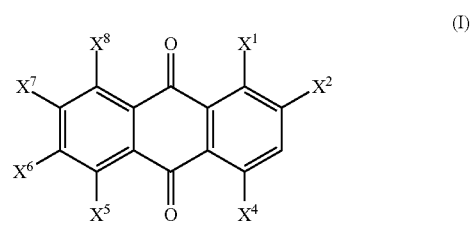

and/or an ion of compound (I), and/or a salt of compound (I), and/or a reduced form of the anthraquinone member of compound (I), wherein: $X^1$, $X^2$, $X^4$, $X^5$, $X^6$, $X^7$ and $X^8$ are independently selected from the group consisting of a hydrogen atom, a linear, cyclic or branched, saturated or unsaturated, optionally substituted, hydrocarbon group including from 1 to 10 carbon atoms, a OH group and a —O-A-$R^1$ group, A representing a linear, cyclic or branched, saturated or unsaturated, optionally substituted, hydrocarbon group including from 1 to 10 carbon atoms; $R^1$ representing COOH or $SO_3H$; wherein one and only one of $X^1$, $X^2$, $X^4$, $X^5$, $X^6$, $X^7$ and $X^8$ is OH, and wherein one and only one of $X^1$, $X^2$, $X^4$, $X^5$, $X^6$, $X^7$ and $X^8$ is —O-A-$R^1$.

20 Claims, 19 Drawing Sheets

(56) References Cited

U.S. PATENT DOCUMENTS

2017/0187059 A1* 6/2017 Potash .............. H01M 8/04276
2019/0115594 A1   4/2019 Yang et al.
2019/0152902 A1* 5/2019 Krawczyk ............. C07C 303/06

FOREIGN PATENT DOCUMENTS

| WO | WO-2014052682 A2 * | 4/2014 | ............ H01M 8/188 |
| WO | 2015/048550 | 4/2015 | |
| WO | WO-2019072385 A1 * | 4/2019 | ............ H01M 8/188 |
| WO | WO 2019157437 * | 8/2019 | |

OTHER PUBLICATIONS

International Search Report for PCT/EP2020/087256 dated Apr. 7, 2021, 4 pages.
Written Opinion of the ISA for PCT/EP2020/087256 dated Apr. 7, 2021, 7 pages.

* cited by examiner

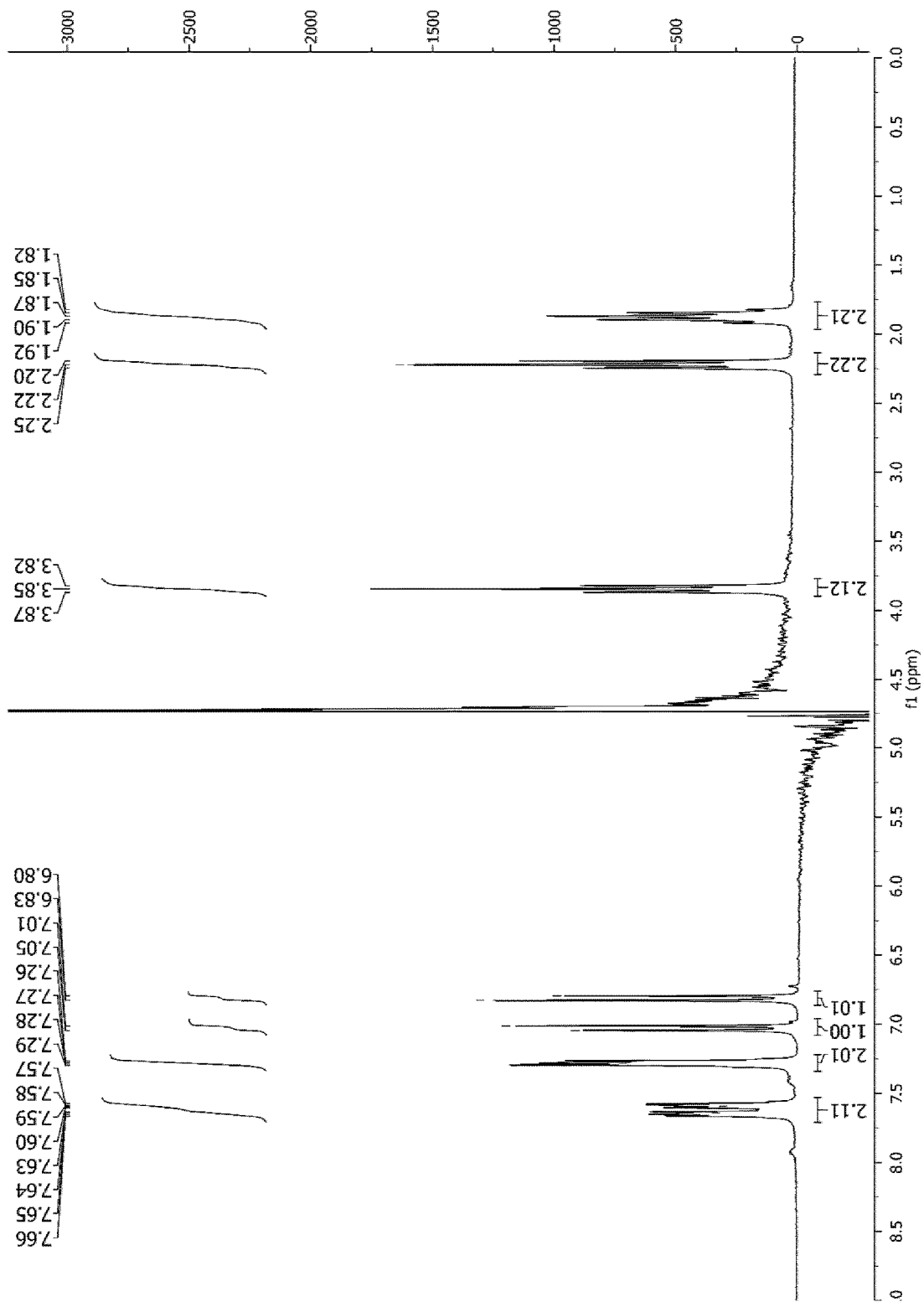
FIG.3 (Beginning)

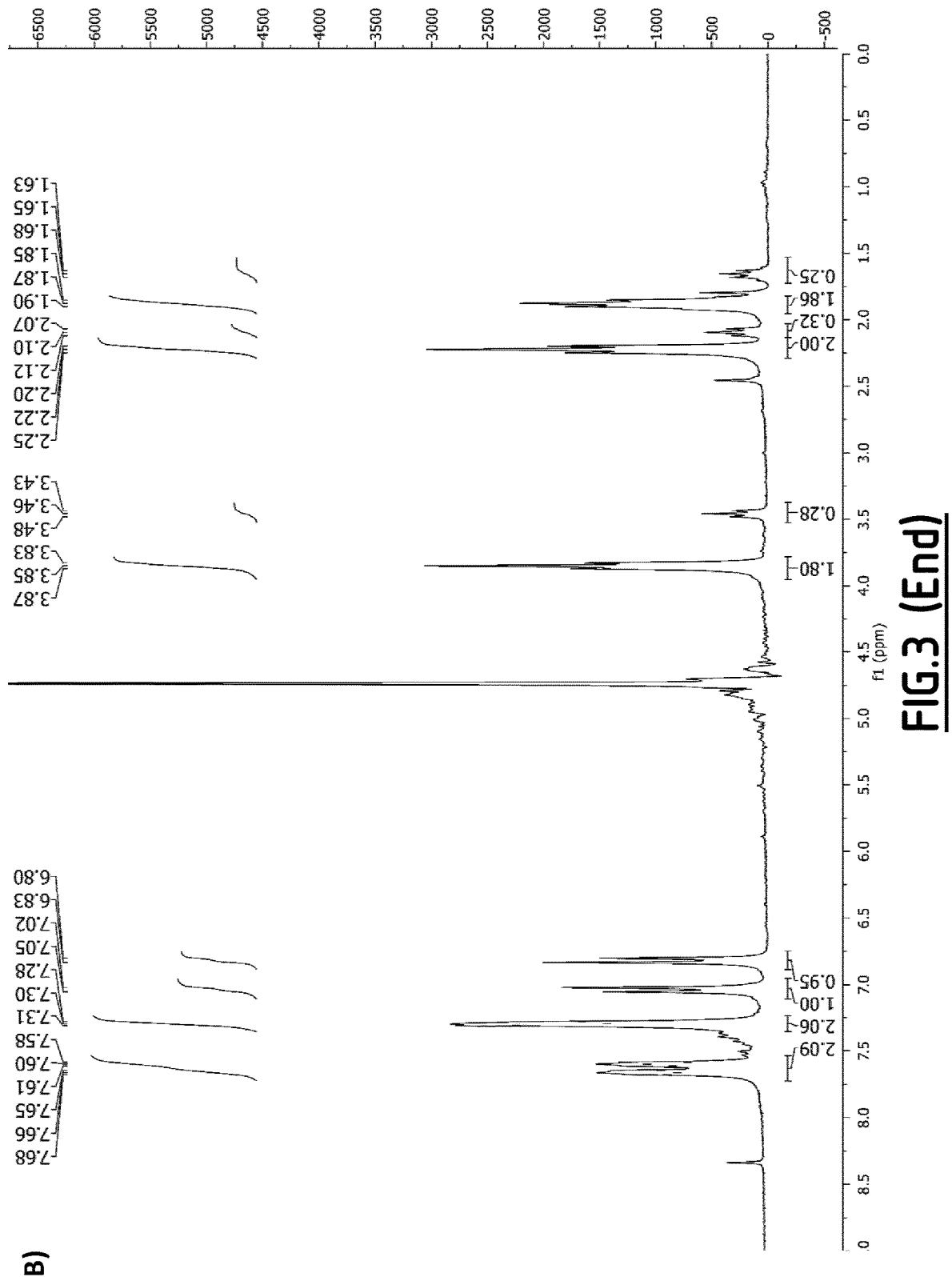
FIG. 3 (End)

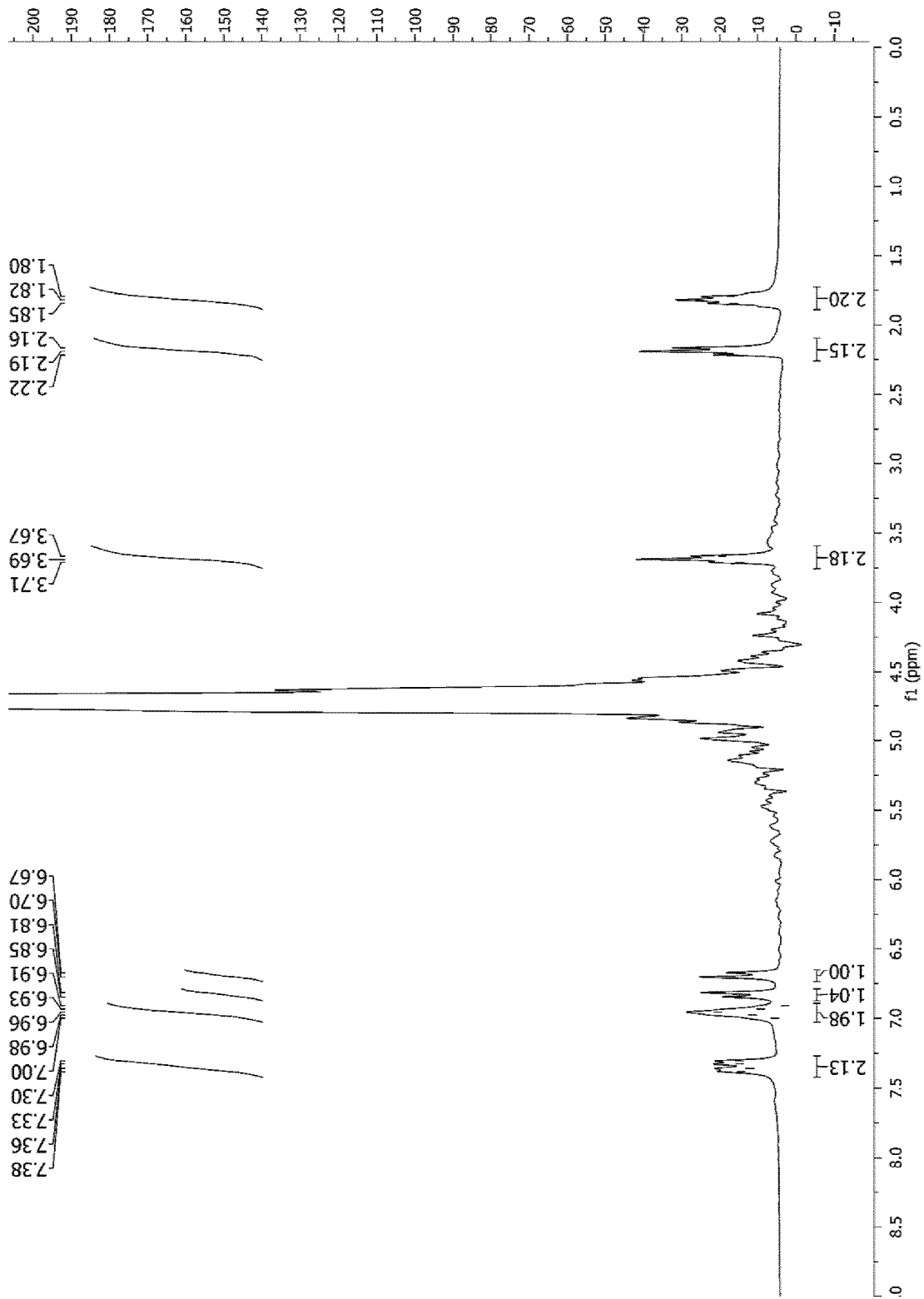
FIG. 4 (Beginning)

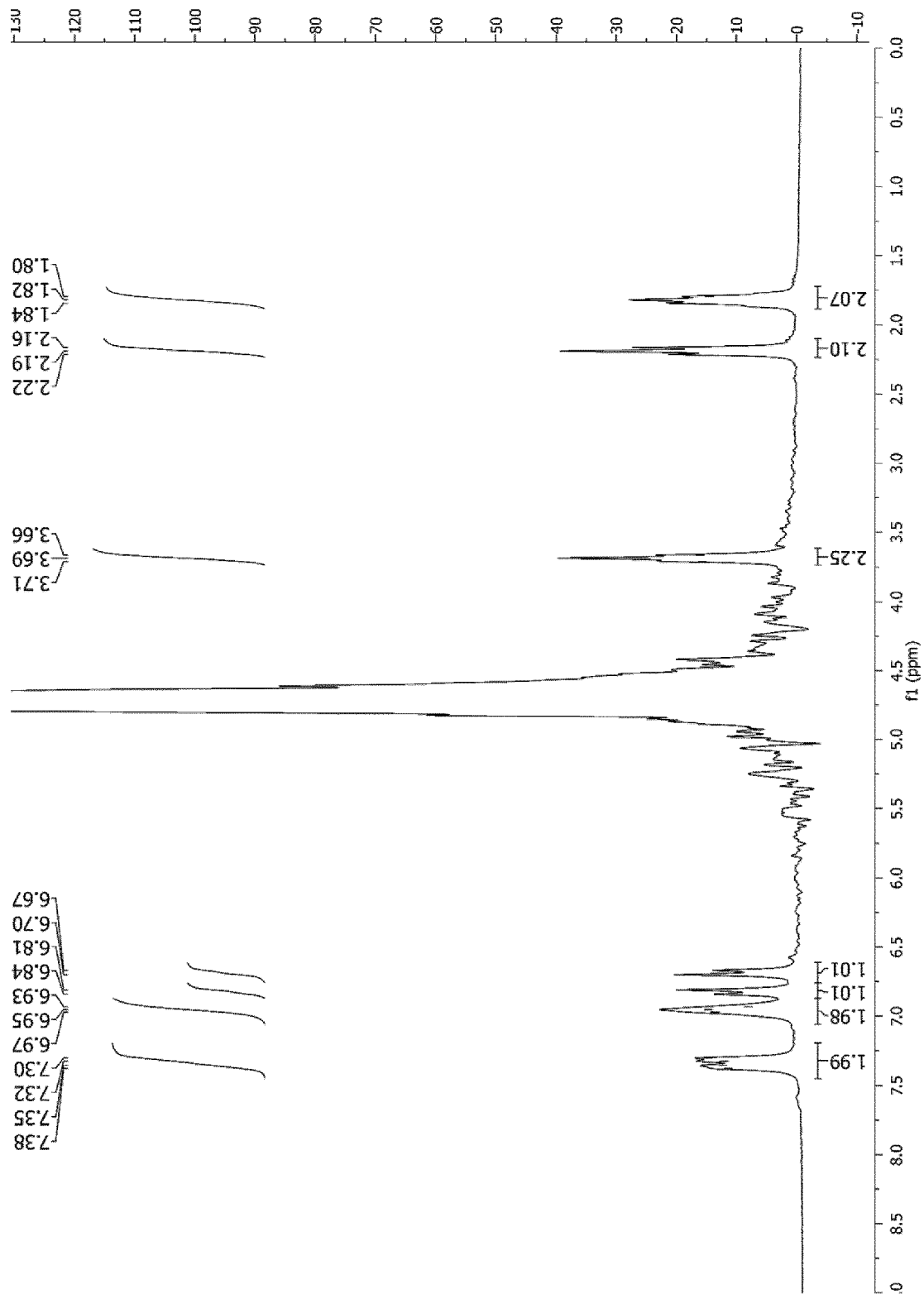
FIG. 4 (End)

AQUEOUS ORGANIC-BASED ELECTROLYTE FOR REDOX FLOW BATTERY

CROSS-REFERENCE TO RELATED APPLICATIONS

This application is the U.S. national phase of International Application No. PCT/EP2020/087256 filed Dec. 18, 2020 which designated the U.S. and claims priority to EP Patent Application No. 19306735.2 filed Dec. 20, 2019, the entire contents of each of which are hereby incorporated by reference.

BACKGROUND OF THE INVENTION

Field of the Invention

The present invention concerns to the field of redox flow battery. The present invention in particular relates to an aqueous electrolyte for redox flow battery. The present invention also relates to a redox flow battery comprising such aqueous electrolyte, and a method for producing current.

Description of the Related Art

Redox flow batteries are flow batteries that employ a couple of redox compounds in each half-cell electrolyte. Indeed, the nature of the redox compounds plays an important role in the performances of the redox flow batteries.

Vanadium technology has proven its efficiency worldwide at utility scale and remains a strong competitor to the lithium-ion storage solution in long storage duration modes (above 4 hours of storage). However, vanadium ore market suffers from important price fluctuations while the energy storage demand is already exploding.

To date, several alternatives have emerged concerning the nature of the redox compounds of the electrolyte, comprising the use of organic, organometallic, coordination complexes or inorganic redox compounds. Outstanding stabilities and high energy densities are disclosed but both criteria are never matched at the same time.

WO 2019/157437 describes a redox flow battery including an aqueous electrolyte comprising a disubstituted anthraquinone derivative as redox active material. However, the performances of this redox flow battery, such as its stored capacity, its energy density or its cyclability should be improved. In particular, the redox flow batteries disclosed do not display performances meeting the requirements to be economically viable. In addition, these redox flow batteries were not tested under conditions within which the redox flow batteries are operated in real systems.

US2019/115594 describes a flow battery including substituted anthraquinone as redox compound. However, these flow batteries feature a low energy density and a low stability. In addition, the conditions of the full cell tests do not describe the flow rate, the size cell or the volume of both electrolytes, which are important factors of actual operating conditions. Also, the full cell tests were performed under galvanostatic mode, which is not representative of the actual operating conditions of a redox flow battery.

CN107171012 discloses a flow battery electrolyte liquid based on alizarin or derivatives thereof, and its use as the flow battery of negative pole. However, these flow batteries feature either a low energy density (1.2 Wh/L) and a low stability (coulombic efficiency=98.3%) using alizarin red S in the negolyte or a good energy density (5.2 Wh/L) and a very low stability (coulombic efficiency=97.1% and 97.8%) using alizarin complexone in the negolyte. In addition, the conditions of the full cell tests, as the flow rate, are unclear, and the full cell tests were performed under galvanostatic mode, which is not representative of the actual operating conditions of a redox flow battery.

WO2015/048550 describes an electrochemical cell for a flow battery cell in which electrical energy is stored chemically at an electrochemical electrode by the protonation of small organic molecules called quinones to hydroquinones. However, these flow batteries feature a low energy density (0.2 M electron in each side) and a low stability (occurrence of irreversible hydroxylation during the cycling test). In addition, the conditions of the full cell tests, as the flow rate, are unclear, and the full cell tests were performed under galvanostatic mode, which is not representative of the actual operating conditions of a redox flow battery.

WO2014/052682 also relates to an electrochemical cell for a flow battery cell in which electrical energy is stored chemically at an electrochemical electrode by the protonation of small organic molecules called quinones to hydroquinones. However, these flow batteries feature a low stability taking into considerations the very low coulombic efficiencies (93-95%) and the capacity loss after 10 cycles and 100 hours of cycling that can be measured on the described full cell test. In addition, the conditions of the full cell tests do not describe the flow rate or the volume of the negolyte, which are important factors of actual operating conditions. Also, the full cell tests were performed under galvanostatic mode, which is not representative of the actual operating conditions of a redox flow battery.

SUMMARY OF THE INVENTION

The present invention aims to solve the technical problem of providing an aqueous electrolyte for redox flow battery displaying a high stored capacity.

The present invention aims to solve the technical problem of providing an aqueous electrolyte for redox flow battery displaying a high energy density.

The present invention aims to solve the technical problem of providing an aqueous electrolyte for redox flow battery displaying a high stability and cyclability, i.e. a lower capacity loss over time.

The present invention aims to solve the technical problem of providing an aqueous electrolyte for redox flow battery displaying high performances, in particular when tested under conditions close to real systems.

In particular, the present invention aims to solve the technical problem of providing an aqueous electrolyte for redox flow battery displaying at the same time a high stored capacity, a high energy density and a high stability and cyclability, in particular when operated under actual operating conditions.

Thus, the present invention aims to solve the technical problem of providing an aqueous electrolyte for redox flow battery fulfilling the requirements of the market of the stationary energy storage systems with decent technical performances and cost.

The complexity of these technical problems is in particular related to be capable of solving all of them together, which the present invention proposes to solve.

One specific technical problem of the invention was also to provide compounds having better performances (notably stored energy density, stability and cyclability, etc) than compounds of WO 2019/157437.

The present invention aims to solve all of these technical problems reliably and at an economically viable industrial cost.

The invention relates to an aqueous electrolyte for redox flow battery, comprising a compound of formula (I)

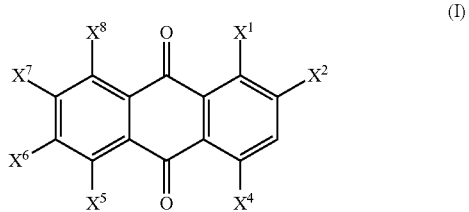

(I)

and/or an ion of compound (I),
and/or a salt of compound (I),
and/or a reduced form of the anthraquinone member of compound (I),
wherein:
$X^1$, $X^2$, $X^4$, $X^5$, $X^6$, $X^7$ and $X^8$ are independently selected from the group consisting of a hydrogen atom, an halogen atom, an ether group of formula —O-A, a linear, cyclic or branched, saturated or unsaturated, optionally substituted, hydrocarbon group comprising from 1 to 10 carbon atoms, a OH group and a —O-A-$R^1$ group,
A representing a linear, cyclic or branched, saturated or unsaturated, optionally substituted, hydrocarbon group comprising from 1 to 10 carbon atoms;
$R^1$ representing COOH or $SO_3H$;
wherein one and only one of $X^1$, $X^2$, $X^4$, $X^5$, $X^6$, $X^7$ and $X^8$ is OH, and
wherein one and only one of $X^1$, $X^2$, $X^4$, $X^5$, $X^6$, $X^7$ and $X^8$ is —O-A-$R^1$.

Preferably, the invention relates to an aqueous electrolyte for redox flow battery, comprising a compound of formula (I)

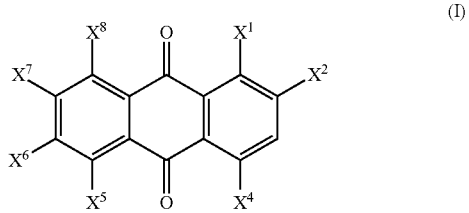

(I)

and/or an ion of compound (I),
and/or a salt of compound (I),
and/or a reduced form of the anthraquinone member of compound (I),
wherein:
$X^1$, $X^2$, $X^4$, $X^5$, $X^6$, $X^7$ and $X^8$ are independently selected from the group consisting of a hydrogen atom, a linear, cyclic or branched, saturated or unsaturated, optionally substituted, hydrocarbon group comprising from 1 to 10 carbon atoms, a OH group and a —O-A-$R^1$ group,
A representing a linear, cyclic or branched, saturated or unsaturated, optionally substituted, hydrocarbon group comprising from 1 to 10 carbon atoms;
$R^1$ representing COOH or $SO_3H$;

wherein one and only one of $X^1$, $X^2$, $X^4$, $X^5$, $X^6$, $X^7$ and $X^8$ is OH, and
wherein one and only one of $X^1$, $X^2$, $X^4$, $X^5$, $X^6$, $X^7$ and $X^8$ is —O-A-$R^1$.

The expression "substituted hydrocarbon group" refers to a hydrocarbon group having one or more hydrogen atoms replaced by another/other atom(s) or group(s) of atoms and to a hydrocarbon chain comprising one or more heteroatoms in the carbon chain.

According to an embodiment, a substituted hydrocarbon group comprising from 1 to 10 carbon atoms comprises one to five heteroatoms independently selected from the group consisting of O, N, and S.

According to an embodiment, A represents a linear, cyclic or branched, saturated or unsaturated, optionally substituted, hydrocarbon group comprising from 1 to 10 carbon atoms, or represents a linear, cyclic or branched, saturated or unsaturated hydrocarbon group comprising from 1 to 10 carbon atoms and further including from 1 to 3 oxygen atoms, preferably one oxygen atom, and is for example —$CH_2$—$CH_2$—O—$CH_2$—$CH_2$—.

WO 2019/157437 describes a redox flow battery including an aqueous electrolyte comprising an anthraquinone derivative.

WO 2019/157437 relates to di-substituted dihydroxy-anthraquinone isomers. However, the compounds of formula (I) according to the invention are mono-substituted dihydroxy-anthraquinone isomers. It has been surprisingly found by the present inventors that a compound of formula (I) according to the invention solves the technical problems recited above.

According to the invention, a mono-substituted dihydroxy-anthraquinone refers to a dihydroxy-anthraquinone in which only one of the two hydroxyl groups is substituted by a radical different from a OH group. The mono-substituted dihydroxy- are defined by opposition to di-substituted dihydroxy-anthraquinone which comprise two substituents on the hydroxyl groups of the dihydroxy-anthraquinone, According to the invention, a di-substituted dihydroxy-anthraquinone refers to a dihydroxy-anthraquinone in which both of the two hydroxyl groups are substituted by radicals different from a OH group.

A compound of formula (I) according to the invention can be reduced by the transfer of one or two electrons. During the reduction of compound (I), one or two ketone function(s) of the anthraquinone member of compound (I) is(are) reduced.

For example, a reduced form of a compound of formula (I) is a compound of formula

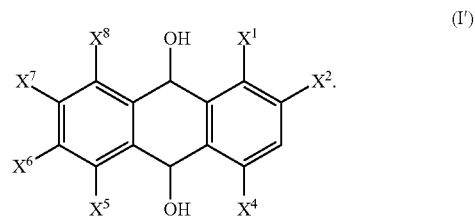

(I')

Reversibly, a compound of formula (I') can be oxidized by the transfer of one or two electrons. During the reduction of compound (I'), one or two hydroxyl function(s) of the dihydroxy-anthracene member of compound (I') is(are) oxidized.

For example, an oxidized form of a compound of formula (I') is a compound of formula (I).

Preferably, in the compound of formula (I) according to the invention, $X^1$ is —O-A-$R^1$ and $X^2$ is OH, or
$X^1$ is OH and $X^2$ is —O-A-$R^1$, or
$X^1$ is —O-A-$R^1$ and $X^4$ is OH, or
$X^1$ is —O-A-$R^1$ and $X^5$ is OH, or
$X^2$ is —O-A-$R^1$ and $X^6$ is OH, or
$X^2$ is —O-A-$R^1$ and $X^7$ is OH, or
$X^1$ is —O-A-$R^1$ and $X^8$ is OH.

Even more preferably, in the compound of formula (I) according to the invention, $X^1$ is —O-A-$R^1$ and $X^4$ is OH.

Preferably, in the compound of formula (I) according to the invention, $X^1$, $X^2$, $X^4$, $X^5$, $X^6$, $X^7$ and $X^8$ are independently selected from the group consisting of a hydrogen atom, a OH group and a —O-A-$R^1$ group, wherein one and only one of $X^1$, $X^2$, $X^4$, $X^5$, $X^6$, $X^7$ and $X^8$ is OH, and wherein one and only one of $X^1$, $X^2$, $X^4$, $X^5$, $X^6$, $X^7$ and $X^8$ is —O-A-$R^1$.

More preferably, the compound of formula (I) according to the invention is selected from the group consisting of

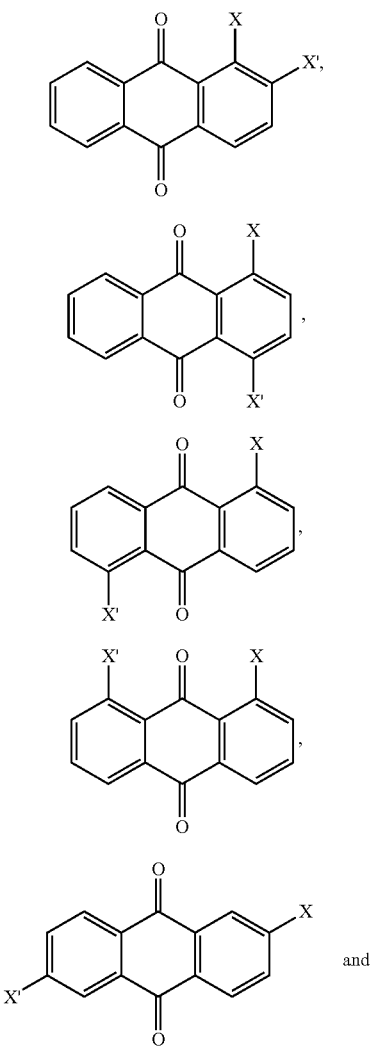

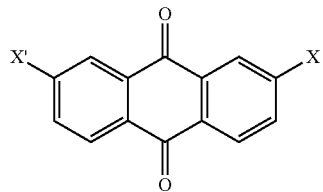

wherein:
if X=OH, X'=—O-A-$R^1$, and
if X=—O-A-$R^1$, X'=OH.

Advantageously, the compound of formula (I) according to the invention is a compound of formula (I-1,4)

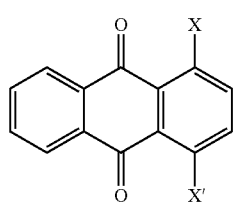

wherein X=—O-A-$R^1$ and X'=OH.

Preferably, in the compound of formula (I) according to the invention, A represents $(CH_2)_n$, optionally substituted, wherein n is an integer selected from 1 to 10, preferably selected from 2 to 5 and more preferably selected from 3 to 4.

According to an embodiment, a substituted $(CH_2)_n$ group wherein n is an integer selected from 1 to 10, preferably selected from 2 to 5 and more preferably selected from 3 to 4, comprises one to five heteroatoms independently selected from the group consisting of O, N, and S.

According to an embodiment, a substituted $(CH_2)_n$ group wherein n is an integer selected from 1 to 10, preferably selected from 2 to 5 and more preferably selected from 3 to 4, includes from 1 to 3 oxygen atoms, preferably one oxygen atom, and is for example —$CH_2$—$CH_2$—O—$CH_2$—$CH_2$—.

Advantageously, in the compound of formula (I), n is equal to 3 or 4.

Preferably, in the compound of formula (I) according to the invention, $R^1$ is selected from the group consisting of $CO_2H$, $CO_2^-M^+$, $SO_3H$ and $SO_3^-M^+$, $M^+$ being selected from the group consisting of $Li^+$, $Na^+$, $K^+$ and $NH_4^+$, preferably $M^+$ is $Na^+$.

According to an embodiment, in the compound of formula (I) according to the invention, A-$R^1$ is selected from the group consisting of —$CH_2$—$CH_2$—O—$CH_2$—$CH_2$—COOH, —$CH_2$—$CH_2$—O—$CH_2$—$CH_2$—$SO_3H$, —$CH_2$—$CH_2$—O—$CH_2$—$CH_2$—$SO_3^{-+}Na$, —$(CH_2)_3$—COOH, —$(CH_2)_4$—COOH, —$(CH_2)_3$—$SO_3H$, —$(CH_2)_4$—$SO_3H$, —$(CH_2)_3$—$SO_3^{-+}Na$ and —$(CH_2)_4$—$SO_3^{-+}Na$.

According to an embodiment, in the compound of formula (I) according to the invention, A-$R^1$ is selected from the group consisting of —$(CH_2)_3$—COOH, —$(CH_2)_4$—COOH, —$(CH_2)_3$—$SO_3H$, —$(CH_2)_4$—$SO_3H$, —$(CH_2)_3$—$SO_3^{-+}Na$ and —$(CH_2)_4$—$SO_3^{-+}Na$.

Advantageously, the compound of formula (I) according to the invention is selected from the group consisting of

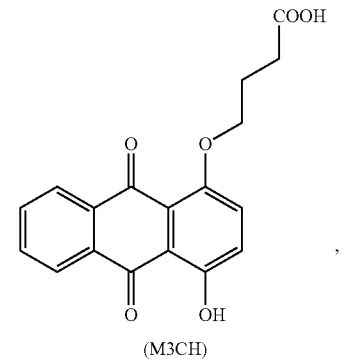
(M3CH)

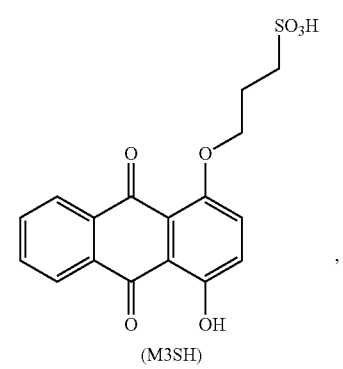
(M3SH)

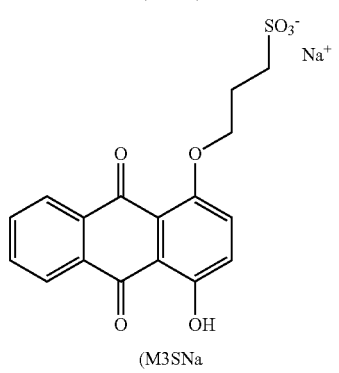
(M3SNa

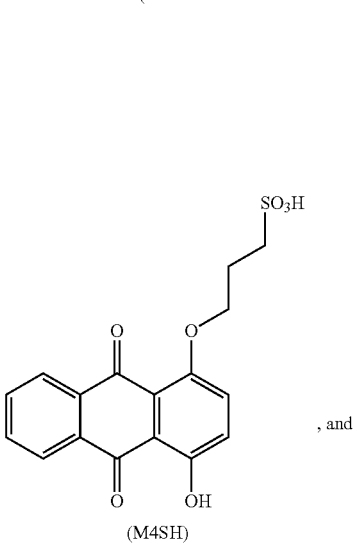
(M4SH)
, and

-continued

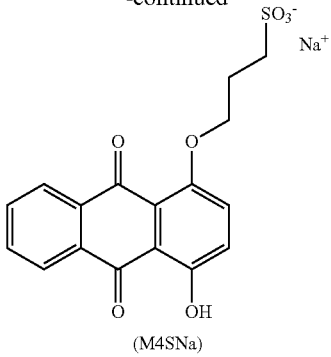
(M4SNa)

More preferably, the compound of formula (I) according to the invention is a compound of formula (M3CH).

According to an embodiment, the aqueous electrolyte of the invention comprises at least one base.

According to another embodiment, the aqueous electrolyte of the invention comprises at least two bases.

Preferably, the base comprises a hydroxide ion, and is preferably selected from the group consisting of potassium hydroxide, sodium hydroxide, lithium hydroxide, ammonium hydroxide, magnesium hydroxide, calcium hydroxide and any combination thereof.

In a preferred embodiment, the aqueous electrolyte of the invention comprises potassium hydroxide, sodium hydroxide or a combination of potassium hydroxide and sodium hydroxide.

Preferably, the base is at a concentration of 0.1 to 2 mol/L, preferably of 0.3 to 1.5 mol/L, more preferably of 0.5 to 1.1 mol/L.

According to the embodiment in which the aqueous electrolyte comprises more than one base, the concentration of the base represents the sum of the concentration of each base.

Preferably, the aqueous electrolyte of the invention presents a pH superior or equal to 7 and inferior or equal to 13.5, preferably superior or equal to 9 and inferior or equal to 13.5, more preferably superior or equal to 12 and inferior or equal to 13.5.

The present invention also concerns the use of an aqueous electrolyte according to the invention, as a negative electrolyte in a redox flow battery.

The present invention also concerns a redox flow battery comprising:
a negative pole comprising an aqueous electrolyte according to the invention, and
a positive pole comprising a positive aqueous electrolyte.

Preferably, the positive aqueous electrolyte comprises a redox compound preferably selected from the group consisting of potassium ferrocyanide, sodium ferrocyanide, lithium ferrocyanide, ammonium ferrocyanide, magnesium ferrocyanide, calcium ferrocyanide and any combination thereof, more preferably selected from the group consisting of potassium ferrocyanide and sodium ferrocyanide and any combination thereof.

Preferably, the positive aqueous electrolyte also comprises one base. The base of the positive aqueous electrolyte preferably comprises a hydroxide ion, and is preferably selected from the group consisting of potassium hydroxide, sodium hydroxide, lithium hydroxide, ammonium hydroxide, magnesium hydroxide, calcium hydroxide and any combination thereof.

Preferably, the positive aqueous electrolyte presents a pH superior or equal to 7 and inferior or equal to 13.5, preferably superior or equal to 9 and inferior or equal to 13.5, more preferably superior or equal to 12 and inferior or equal to 13.5.

Preferably, the base comprised in the positive aqueous electrolyte is at a concentration of 0.1 to 1.5 mol/L, preferably of 0.1 to 1.0 mol/L, more preferably of 0.1 to 0.3 mol/L.

The redox flow battery also comprises a membrane. The membrane of the redox flow battery is an ion-exchange material, the membrane being preferably selected from the group consisting of a fluorinated (co)polymer, an ether ketone (co)polymer, an ether sulfone (co)polymer, an ether ether ketone (co)polymer, a sulfonated ether ether ketone (co)polymer, a benzimidazole (co)polymer and an arylene-based (co)polymer, more preferably selected from the group consisting of a sulfonated tetrafluoroethylene based fluoropolymer copolymer, a perfluorosulfonic acid ionomer, an ether ether ketone (co)polymer, a sulfonated ether ether ketone (co)polymer and a benzimidazole (co)polymer.

Preferably, the membrane of the redox flow battery has a thickness comprised between 15 µm and 90 µm, more preferably comprised between 15 and 50 µm.

The membrane is sandwiched between an anode and a cathode. Preferably, the anode and the cathode comprise porous graphite.

According to a specific embodiment, the redox flow battery has an energy density greater than or equal to 4 Wh/L, a storage duration greater than or equal to 3 hours, and a stability greater than or equal to 365 days, preferably greater than or equal to 2 years, more preferably greater than or equal to 5 years.

According to the invention, the energy density of the redox flow battery is the amount of energy density in Wh/L, considering both electrolyte volumes, furnished by the battery during the discharge operation. The energy density can be measured by a discharge process realized under constant power cycling mode at a minimum of 40 mW/cm$^2$, that does not include constant voltage step.

According to the invention, the storage duration of the redox flow battery is the duration of the discharge process of the battery that can be determined under constant power cycling mode at a minimum of 40 mW/cm$^2$, the discharge process not including constant voltage steps.

According to the invention, the stability of the redox flow battery is the calendar lifetime of the battery before losing 20% of its initial capacity that can be determined by considering a cycling test of minimum 5 days of constant cycling.

Generally speaking, a battery according to the invention is not limited by its operating modes and can be operated under various operating conditions.

The battery of the invention can operate under very variable cycling modes, in controlled power, for example from 10 to 150 mW/cm$^2$, and/or energy densities from 2 to 10 Wh/L, and/or storage durations from 1 to 10 hours, and/or even at constant voltages during discharge.

According to a specific embodiment, the redox flow battery is operated at a flow rate less than or equal to 1.5 mL/min/cm$^2$, under a constant power cycling mode greater than or equal to 40 mW/cm$^2$, during a storage duration greater than or equal to 3 hours, at a molar ratio of positive aqueous electrolyte: negative aqueous electrolyte less than or equal to 1.1.

According to the invention, the flow rate of the redox flow battery is the volume of fluid which passes in the battery process per unit of time and active surface of the membrane, it is expressed in mL/min/cm$^2$.

According to the invention, a power cycling mode of the redox flow battery is a cycling instruction using the multiplication of the voltage (V) by the current (A) that is expressed in Watt (W).

According to another specific embodiment, the redox flow battery has an energy density greater than or equal to 4 Wh/L, a storage duration greater than or equal to 3 hours, and a stability greater than or equal to 365 days, preferably greater than or equal to 2 years, more preferably greater than or equal to 5 years when operated at a flow rate less than or equal to 1.5 mL/min/cm$^2$, under a constant power cycling mode greater than or equal to 40 mW/cm$^2$, during a storage duration greater than or equal to 3 hours, at a molar ratio of positive aqueous electrolyte: negative aqueous electrolyte less than or equal to 1.1.

The present invention also concerns a method for generating electricity by at least one redox flow battery, wherein the redox flow battery is defined according to the invention.

Preferably, in the method of the invention, the aqueous electrolyte and the positive aqueous electrolyte are pumped at a flow rate comprised between 0.1 and 1.5 mL/min/cm$^2$, preferably between 0.4 and 0.8 mL/min/cm$^2$, more preferably between 0.5 and 0.6 mL/min/cm$^2$.

According to a specific embodiment, in the method of the invention, the redox flow battery is discharging in a constant power cycling mode.

BRIEF DESCRIPTION OF THE DRAWINGS

FIG. 3 is NMR $^1$H spectra of a solution at pH 13.9 comprising M3CH compound at 0.05 M concentration obtained from sample at a) t0 and b) t+1 month.

FIG. 4 is NMR $^1$H spectra of a solution at pH 13.5 comprising M3CH compound at 0.4 M concentration obtained from sample at a) t1 and b) t+1 month.

DESCRIPTION OF THE PREFERRED EMBODIMENTS

Examples

Figure 1:
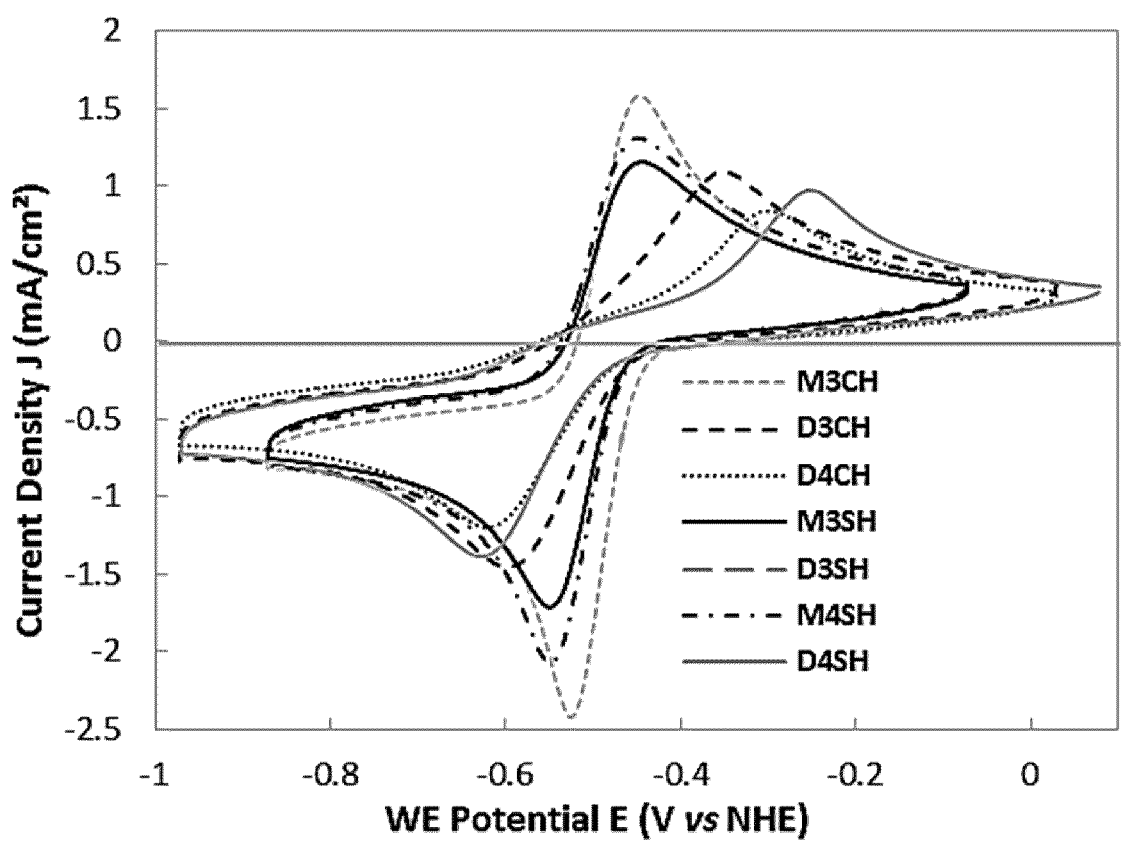
FIG. 1 is a cyclic voltammetry curve (3rd cycle) of compounds of formula (I) recorded at a scan rate of 100 mV·s$^{-1}$ and buffered at pH 13 (KOH 10$^{-1}$M).

Example 1: Synthesis of Compounds of Formula (I)

The synthesized Compounds of Formula (I) are listed in Table 1 below.

These compounds were obtained by the following protocols:

D3CH and D4CH: quinizarin (98%, 0.02 moles) was dissolved in 50 mL of DMF in the presence of ethyl 4-bromobutyrate (95%, 5 eq.) or ethyl 5-bromovalerate and $K_2CO_3$ (100%, 3 eq.). The mixture was heated at 50° C. for 60 h, which resulted into quantitative product formation with 90% purity by $^1$H-NMR. Without any further purification, hydrolysis was performed in the presence of 1 M KOH (85%, 3 eq.), 20 mL of ethanol and 20 mL of tetrahydrofurane at room temperature. After reaction finished, reaction mixture was acidified with 1M HCl to pH 2. Product was precipitated as free acid and collected as solid by filtration.

M3CH: quinizarin (98%, 0.02 moles) were dissolved in 50 mL of DMF in the presence of ethyl 4-bromobutyrate (95%, 1 eq.) and $K_2CO_3$ (100%, 1.1 eq.). The mixture was heated at 50° C. for 48 h. 70% of pure desired product with 30% starting material was obtained. Subsequently, a hydrolysis was performed in the presence of 1 M KOH (85%, 3 eq.), 20 mL of ethanol and 20 mL of tetrahydrofurane at room temperature, followed by a purification through chromatography column.

M3SH and D3SH: quinizarin (98%, 0.01 moles) were dissolved in 50 mL of DMF in the presence of 1,3-propanesultone (98%, 5 eq.) and $K_2CO_3$ (100%, 5 eq.). The mixture was heated at 70° C. for 48 h. The solution was acidified with 1M HCl to pH 2 and purified by reverse-phase chromatography.

M3SNa, M4SNa and D3SNa: M3SH, M4SH or D3SH, respectively, was treated with NaOH (99%, 1 eq.) in 50 mL of water.

TABLE 1

Substitution of the synthesized compounds of formula (I)

(I)

[Anthraquinone structure with substituents $X^1$ through $X^8$]

| Compound (I) | $X^1$ | $X^4$ | $X^2, X^5, X^6, X^7, X^8$ |
|---|---|---|---|
| M3CH | O—$CH_2$—$CH_2$—$CH_2$—COOH | OH | H |
| M3SH | O—$CH_2$—$CH_2$—$CH_2$—$SO_3H$ | OH | H |
| M3SNa | O—$CH_2$—$CH_2$—$CH_2$—$SO_3Na$ | OH | H |
| M4SH | O—$CH_2$—$CH_2$—$CH_2$—$CH_2$—$SO_3H$ | OH | H |
| M4SNa | O—$CH_2$—$CH_2$—$CH_2$—$CH_2$—$SO_3Na$ | OH | H |
| D3CH (comparative) | O—$CH_2$—$CH_2$—$CH_2$—COOH | O—$CH_2$—$CH_2$—$CH_2$—COOH | H |
| D4CH (comparative) | O—$CH_2$—$CH_2$—$CH_2$—$CH_2$—COOH | O—$CH_2$—$CH_2$—$CH_2$—$CH_2$—COOH | H |
| D3SH (comparative) | O—$CH_2$—$CH_2$—$CH_2$—$SO_3H$ | O—$CH_2$—$CH_2$—$CH_2$—$SO_3H$ | H |
| D3SNa (comparative) | O—$CH_2$—$CH_2$—$CH_2$—$SO_3Na$ | O—$CH_2$—$CH_2$—$CH_2$—$SO_3Na$ | H |
| D4SH (comparative) | O—$CH_2$—$CH_2$—$CH_2$—$CH_2$—$SO_3H$ | O—$CH_2$—$CH_2$—$CH_2$—$CH_2$—$SO_3H$ | H |

M4SH and D4SH: quinizarin (98%, 12 mmoles) was dissolved in 50 mL of DMF in the presence of 1,4-butane-sultone (98%, 5 eq.) and $K_2CO_3$ (100%, 5 eq.). The mixture was heated at 70° C. for 48 h. The solution was acidified with 6 M $H_2SO_4$ to pH 2 and purified by reverse-phase chromatography.

These compounds were analyzed by $^1H$ NMR (Table 2): spectra were recorded on BRUKER AC 300 P (300 MHz) spectrometer. Chemical shifts are expressed in parts per million downfield from tetramethylsilane as an internal standard. Data are given in the following order: d value, multiplicity (s, singlet; d, doublet; t, triplet; q, quartet; m, multiplet; br, broad), number of protons, coupling constants J is given in Hertz. Purity is estimated by quantitative-NMR using tetramethylsilane as an internal standard.

Example 2: Solubility of Compounds of Formula (I)

The solubility of the compounds of formula (I) and of comparative disubstituted derivatives (D3CH, D4CH, D3SH, D3SNa and D4SH) was evaluated in aqueous solution at various pH by shake-flask method (Table 3). An aqueous solution (containing either KCl 1M, KOH 1M or $H_2SO_4$ 1M) is added over 100 mg of compound by 20 μL portions until complete solubilization. We obtain an approximate range of solubility values calculated as following:

Smax~(m/M)/V; m=mass of evaluated compound (g); M=molar mass of evaluated compound (g·mol$^{-1}$); V=added volume (L).

TABLE 2

$^1H$ NMR characterization of compounds of formula (I)

| Compound of formula (I) | $^1H$ NMR (300 MHz, DMSO-$d_6$) | Purity |
|---|---|---|
| M3CH | δ 8.22-8.07 (m, 2H), 7.96-7.80 (m, 2H), 7.61 (d, J = 9.4 Hz, 1H), 7.35 (d, J = 9.4 Hz, 1H), 4.14 (t, J = 6.2 Hz, 2H), 2.57 (t, J = 7.4 Hz, 2H), 2.07-1.92 (m, 2H) | 96% |
| M3SH | δ 12.86 (s, 1H), 8.19 (td, J = 7.4, 1.7 Hz, 2H), 8.00-7.82 (m, 2H), 7.66 (d, J = 9.4 Hz, 1H), 7.40 (d, J = 9.4 Hz, 1H), 4.24 (t, J = 6.1 Hz, 2H), 2.77 (t, J = 6.6 Hz, 2H), 2.09 (t, J = 7.0 Hz, 2H) | 92.7% (suggesting the presence of inorganic salts) |
| M3SNa | δ 12.84 (s, 1H), 8.24-8.12 (m, 2H), 7.90 (pd, J = 7.3, 1.6 Hz, 2H), 7.63 (d, J = 9.5 Hz, 1H), 7.36 (d, J = 9.4 Hz, 1H), 4.23 (t, J = 6.4 Hz, 2H), 2.71 (dd, J = 8.4, 6.5 Hz, 2H), 2.16-2.00 (m, 2H) | 84.9% (impurities of inorganic salts) |
| M4SH | δ 12.87 (s, 1H), 8.20 (ddd, J = 10.7, 7.3, 2.0 Hz, 2H), 8.00-7.83 (m, 2H), 7.69 (d, J = 9.5 Hz, 1H), 7.40 (d, J = 9.4 Hz, 1H), 4.13 (t, J = 6.0 Hz, 2H), 1.95-1.75 (m, 2H) | 85.4% |
| M4SNa | δ 12.83 (s, 1H), 7.58-7.46 (m, 4H), 6.99 (d, J = 9.6 Hz, 1H), 6.73 (d, J = 9.6 Hz, 1H), 3.78 (t, J = 6.0 Hz, 2H), 3.02 (t, J = 7.5 Hz, 2H), 1.91-1.77 (m, 4H) | 80.1% |
| D3CH (comparative) | δ 12.48 (d, J = 215.4 Hz, 2H), 8.05 (dd, J = 5.8, 3.3 Hz, 2H), 7.82 (dd, J = 5.8, 3.3 Hz, 2H), 7.55 (s, 2H), 2.57 (t, J = 7.4 Hz, 4H), 2.00 (t, J = 6.9 Hz, 4H) | >95% |
| D4CH (comparative) | δ 12.03 (s, 2H), 8.03 (dd, J = 5.8, 3.3 Hz, 2H), 7.81 (dd, J = 5.8, 3.3 Hz, 2H), 7.54 (s, 2H), 4.15-4.05 (m, 4H), 2.34 (t, J = 6.8 Hz, 4H), 1.78 (dq, J = 10.7, 4.4, 3.7 Hz, 8H) | >95% |
| D3SH (comparative) | δ 8.07 (dd, J = 5.8, 3.3 Hz, 2H), 7.82 (dd, J = 5.8, 3.3 Hz, 2H), 7.55 (s, 2H), 4.19 (t, J = 6.3 Hz, 4H), 2.78-2.66 (m, 4H), 2.15-2.02 (m, 4H) | 73.4% (suggesting the presence of inorganic salts) |
| D3SNa (comparative) | δ 8.07 (dd, J = 5.8, 3.3 Hz, 2H), 7.81 (dd, J = 5.8, 3.3 Hz, 2H), 7.55 (s, 2H), 4.18 (t, J = 6.4 Hz, 4H), 2.72-2.65 (m, 4H), 2.07 (p, J = 6.7 Hz, 4H) | 59.4% (impurities of inorganic salts) |
| D4SH (comparative) | δ 8.24 (s, 2H), 8.05 (dd, J = 5.8, 3.3 Hz, 2H), 7.81 (dd, J = 5.8, 3.3 Hz, 2H), 7.57 (s, 2H), 4.10 (t, J = 5.8 Hz, 4H), 2.56 (d, J = 5.6 Hz, 4H), 1.85 (dp, J = 9.5, 5.3, 4.3 Hz, 8H) | 80.8% |

TABLE 3

Solubility of compounds of formula (I) in aqueous solution at various pH

| Compound (I) | Unbuffered solution (KCl 1M) | Solution at pH 14 (KOH 1M) | Solution at pH 0 (H$_2$SO$_4$ 1M) |
|---|---|---|---|
| Quinizarin (comparative) | 0.00 | <0.05 | 0.00 |
| M3CH | 0.00 | 0.53 | 0.31 |
| M3SH | 0.75 | 0.23 | 0.31 |
| M3SNa | 0.32 | 0.00 | 0.46 |
| M4SH | 0.51 | 0.46 | Not determined |
| M4SNa | 0.65 | 0.88 | 0.37 |
| D3CH (comparative) | 0.00 | 0.42 | 0.30 |
| D3SH (comparative) | 0.69 | 0.92 | 0.73 |
| D3SNa (comparative) | 0.54 | 0.44 | 0.15 |
| D4SH (comparative) | 1.58 | 0.78 | 0.91 |
| D4CH (comparative) | 0.00 | 0.46 | 0.00 |

These results shows that monosubstituted compounds of formula (I) exhibit a much higher solubility in neutral, basic or acidic media compared to the unsubstituted quinizarin.

Thus, it would have expected to observe a similar significant difference between the monosubstituted compounds of formula (I) and the comparative disubstituted derivatives.

Surprisingly, the monosubstituted compounds of formula (I) exhibit a solubility in neutral, basic or acidic media in the same order of magnitude than the corresponding comparative disubstituted derivatives.

These results demonstrate that the disubstitution of both hydroxyl groups of the quinizarin is not necessary to obtain redox compound having a solubility compatible with their use in an aqueous redox flow battery.

Without being bound by any particular theory, it seems that the length of A of the O-A-R$^1$ group has an important role on the solubility of the compound of formula (I).

Example 3: Cyclic Voltammetry Measurements

Cyclic voltammetry experiments were performed at a 100 mV/s scan rate for compounds M3CH, D3CH, D4CH, M3SH, D3SH, M4SH and D4SH in solution at pH 13 (KOH 0.1 M) or pH 14 (KOH 1 M).

The electrochemical experiments were conducted on an electrochemical working station (BioLogic Science Instruments VSP) at 25° C. using a three-electrodes electrochemical cell, where a Pt wire was employed at the counter electrode (CE), an Ag/AgCl/KCl saturated electrode immerged in a 1 M KOH solution protected from the cell by a porous frit glass served as the reference electrode (RE) and a rotating disc electrode (RDE) mounted with a glassy carbon (GC, 7.069 mm$^2$) disk was used as the working electrode (WE), respectively. The potential was reported relative to the normal hydrogen electrode (NHE), which was converted from the Ag/AgCl reference electrode (0.230 V versus NHE). The ohmic drop between the WE and RE is determined by current interrupt experiments and leads to a value close to 0.7069 Ω·cm$^2$. All cyclic voltammetry experiments were conducted by alleviating most of this resistance (85%) using the potentiostat manual ohmic drop compensation. Before each electrochemical measurement, the GC disk electrode was polished using SiC P4000 foil.

Each recorded cyclic voltammetry of the reduction and the oxidation process of a compound at a given scan rate is analyzed by measuring $i_{p,a}$=anodic peak current; $i_{p,c}$=cathodic peak current; v=scan rate; $E_{p,a}$=anodic peak potential; $E_{p,c}$=cathodic peak potential; $\Delta E_p=E_{p,a}-E_{p,c}$; the apparent standard redox potential $E^{0'}=(E_{p,a}-E_{p,c})/2$.

Linear sweep voltammetry (LSV) using the RDE at various rotation speed (400 up to 1 000 RPM) were performed to determine the averaged half-wave potential $E_{1/2}$.

The oxidation ($D_O$) and the reduction ($D_R$) diffusion coefficients were calculated using Randles-Sevcik (RS) equation $i_p=0.4463 \cdot n^{3/2} \cdot F^{3/2} \cdot A \cdot C \cdot v^{1/2} \cdot D^{1/2} \cdot R^{-1/2} \cdot T^{-1/2} = Cye \cdot v^{1/2} \cdot D^{1/2}$, n=number of electrons exchanged during the redox process; F=faradaic number=96485 C·mol$^{-1}$; A=electrode active surface; C=redox active molecule concentration; R=gas constant=8.314 J·K$^{-1}$·mol$^{-1}$; T=bulk temperature=299 K. The experiments are conducted by cyclic voltammetry at various scan rates ranging from 10 mV/s up to 20 V/s.

A graphic of li$_{p,a}$l and li$_{p,c}$l=f(Ctexv$^{1/2}$) is plotted, if the redox process is reversible and diffusion controlled, the peak current should be proportional to the square root of the scan rate. The diffusion coefficients (oxidation and reduction) are then calculated by taking the square of the regression lines slopes. Diffusion coefficients (oxidation and reduction processes) are evaluated by plotting the peak current versus a constant multiplied by the square root of the scan rate. The plots regression line gives a straight line with perfect correlation coefficient (100%) confirming that the redox process is reversible and diffusion controlled. The square of each slope gives the associated coefficient diffusion in cm$^2$ s$^{-1}$.

The apparent heterogeneous rate constant during oxidation ($k^{0'}_O$)/and reduction ($k^{0'}_R$) process was calculated using Gileadi's equation (C. Rüssel, W. Jaenicke, Electrochimica Acta, Vol 27, N° 12, 1745-1750, 1982) log $k^{0'}=-0.48\alpha + 0.52 + \log[(nF\alpha v_c D)/(2.303RT)]^{1/2}$; $v_c$ is the critical scan rate, it is calculated by plotting the peak potentials versus the logarithm of the scan rates, and is more precise when a very wide range of scan rates is used, which is the case here (0.010 up to 20 V·s$^{-1}$), it is determined at the x-axis of the point of intersection of the regression lines drawn at low and high scan rates; a is the transfer coefficient that is supposed to be close to 0.5 for all presented compounds.

Figure 2:
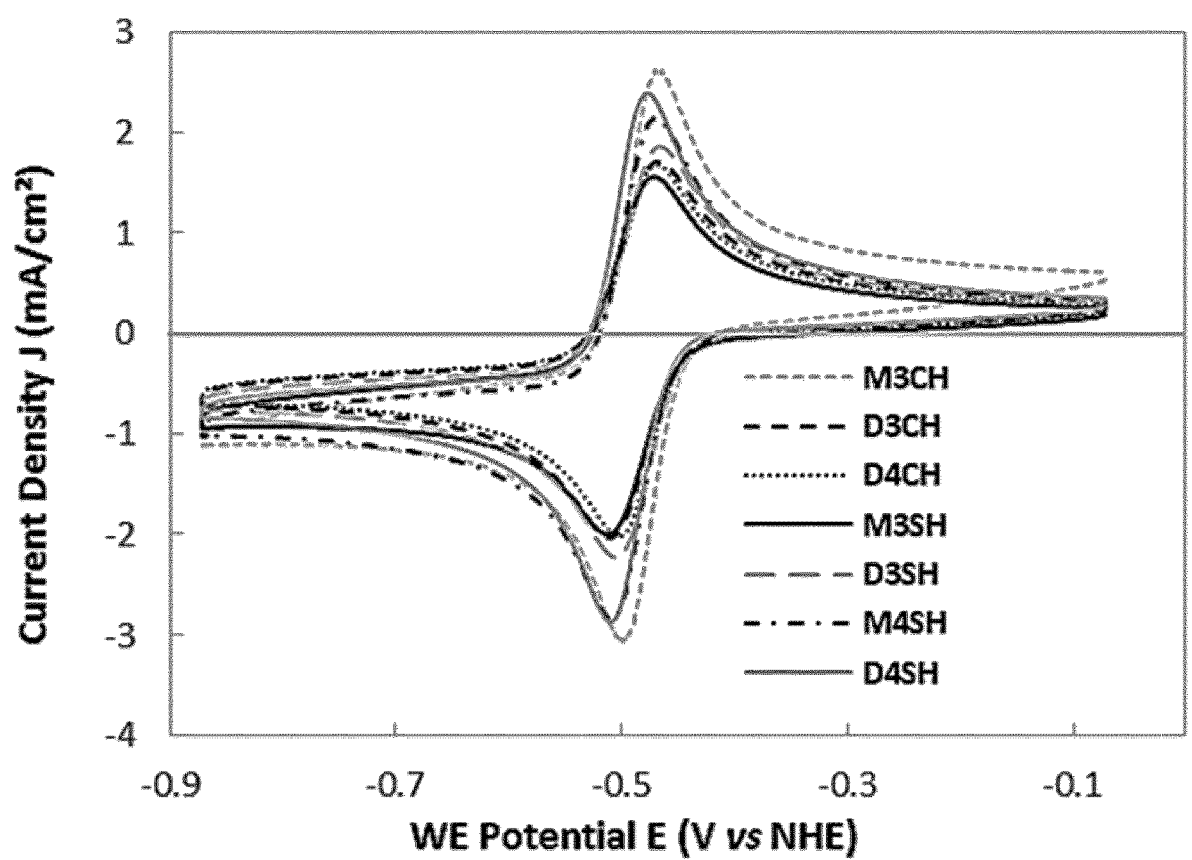
FIG. 2 is a cyclic voltammetry curve (3rd cycle) of compounds of formula (I) recorded at a scan rate of 100 mV·s$^{-1}$ and buffered at pH 14 (KOH 1M).

Peak-to-peak separation ΔEp values were determined from the third cycle of each cyclic voltammogram (FIGS. 1 and 2) and are gathered in the following table 4.

TABLE 4

Peak-to-peak separation ΔEp of compounds of formula (I) at pH 13 and pH 14

| Compound (I) | ΔEp (mV) | |
|---|---|---|
| | pH 13 | pH 14 |
| M3CH | 140 | 31 |
| M3SH | 97 | 40 |
| M4SH | 97 | 39 |
| D3CH (comparative) | 267 | 46 |
| D4CH (comparative) | 328 | 32 |
| D3SH (comparative) | 246 | 40 |
| D4SH (comparative) | 390 | 32 |

In the case of comparative disubstituted derivates (D3CH, D4CH, D3SH and D4SH), at pH 13, the electron transfer is relatively slow (240<ΔEp<390 mV). On the contrary, monosubstituted compounds of formula (I) according to the invention exhibit a relatively fast electron transfer (in a slightly lower extent for M3CH).

At pH 14, the measured ΔEp are comprised between 31 and 46 mV for both monosubstituted compounds of formula (I) according to the invention and disubstituted comparatives compounds. These values are close to the theoretical value that is approached when 2 electrons are simultaneously transferred during a fast and reversible redox process (ΔEp=59/2=29.5 mV) and when no protons are exchanged. Either way, the measured ΔEp values at pH 14 indicate that all compounds exhibits an apparent simultaneous 2 electrons transfer during their respective redox process.

The standard redox process reversibility evaluation is performed in diluted state, at 5 mM of concentration, at pH 14 buffered with 1 M of KOH. Alan J. Bard et al. (A. J. Bard and L. R. Faulkner, Electrochemical Methods, Wiley, N.Y., 2nd edition, 2001) presents the 5 criteria defining the reversibility of a redox process in the handbook of electrochemical methods:

i) the peak current absolute values must be proportional to the square root of the scan rate;
ii) the peak potentials must be independent at all scan rates;
iii) the potential peak difference must be equal to 59/n if no protons are involved, n=number of electron involved in the redox process (2 electrons in this case);
iv) the ratio of peak current absolute values must be equal to the unity;
v) the apparent standard redox potential ($E^{0'}$) must be equal to the half-wave potential ($E_{1/2}$).

Main electrochemical properties of compound of formula (I) are gathered in table 5.

TABLE 5

Electrochemical parameters of compounds of formula (I)

| Compound (I) | $E^{0'}$ (V vs NHE) | $E_{1/2}$ (V vs NHE) | $D_O \times 10^{-6}$ (cm$^2$/s) | $k^{0'}_O \times 10^{-2}$ (cm/s) |
|---|---|---|---|---|
| M3CH | −0.484 | −0.484 | 5.2 | 2.3 |
| M3SH | −0.489 | −0.489 | 4.6 | 3.1 |
| M4SH | −0.494 | −0.494 | 5.8 | 3.1 |

Most redox potentials of compound of formula (I) are similar, close to −0.49 V vs NHE which allows to reach an open-circuit-voltage (ocv) of about 1 V at 50% state-of-charge (SOC) in a cell involving standard ferricyanide/ferrocyanide redox couple ($E^{0'}$=0.5 V vs NHE) in the posolyte.

The redox process is fast and reversible for a compound of formula (I). This result is important as it discloses the ability of the redox active material to undergo multiple charge and discharge processes without changes of electrochemical properties and performances.

The diffusion coefficients values vary from 4.5 to 6×10$^{-6}$ cm$^2$/s which is typical of redox active materials used in aqueous redox flow battery (ARFB) negolytes in aqueous medium (see table 6 below). Inversely, the electron transfer kinetics (O stands for oxidant) obtained with compounds of formula (I) (>10$^{-2}$ cm/s) are faster than most redox active materials used in ARFB negolytes.

TABLE 6

Diffusion coefficients and electron transfer kinetics of various comparative redox-active molecules used in negolytes in aqueous redox flow battery

| Comparative redox active material in negolytes | $D_O \times 10^{-6}$ (cm$^2$/s) | $k^{0'}_O \times 10^{-2}$ (cm/s) |
|---|---|---|
| DHBQ | 3.66 | 0.21 |
| DHAQ | 4.8 | 0.70 |
| DBEAQ | 1.58 | 0.70 |
| DPPEAQ | 1.37 | |
| Flavine FMN-Na | 1.3 | 0.53 |
| AQ-2,7-DS | 3.8 | 0.72 |
| BTMAP-Vi | 3.3 | 2.2 |
| $V^{3+}/V^{2+}$ | 4 | 0.0017 |

Example 4: Degradation Rates

A preliminary degradation study has been performed on M3CH compound at oxidized state in order to exhibit its stability towards two different ionic environments.

This study consists of NMR $^1$H measurements of an electrolyte heated at 40° C. and kept under stirring at 300 RPM using a magnetic stirrer.

4.1. High pH and Low Concentration

The compound was formulated with 0.05 M concentration of M3CH compound, 0.6 M KOH and 0.3 M NaOH which exhibited a pH of 13.9.

The first NMR $^1$H spectra (FIG. 3-a) exhibited a typical M3CH proton signature (aromatic protons in the 6.5 to 8.0 ppm region and 3 alkene groups at 1.9; 2.2 and 3.8 ppm) while FIG. 3-b revealed a structural modification through the apparition of 3 distinct proton peak groups (most likely alkenes) at 1.6; 2.1 and 3.4 ppm. This signal modification suggests a deprotection of the alkyle-carboxylic arm, forming the 1,4-dihydroxyanthraquinone back along with its deprotected arm, namely the 3-hydroxy-propionic acid under potassium or sodium salt. Such behavior was detailed in the literature (WO 2019/157437) and is characteristic of a nucleophilic attack i.e. of OH$^-$ in strong alkaline environment causing the functionalized arm to be cleaved. An integration of the shifted alkene groups allowed a quantification of the degradation product formation (Table 7) and suggests a degradation rate of roughly 15% per month, which is far from the battery stability requirements.

TABLE 7

Percentage of degradation product formed over time

| Time (days) | % of degradation product |
|---|---|
| 0 | 0 |
| 31 | 14-16 |

This degradation rate is likely to be enhanced in higher solute concentration (statistically favorable and increased intermolecular collisions number), at higher temperature (thermodynamic activation) and in stronger alkaline solutions (increased OH$^-$ concentration).

4.2 Lower pH and Higher Concentration

In the scope of formulating an electrolyte with decent redox active molecule concentration and exhibiting a sufficient stability, a solution with M3CH compound at 0.4 M concentration at pH 13.5 containing 0.8 M KOH and 0.3 M NaOH was tested following the same procedure as the previous example.

A similar NMR $^1$H spectra was recorded the first day (FIG. 4-$a$) and a month later (FIG. 4-$b$), showing that the M3CH compound did not undergo any degradation.

This result suggests that the compounds described in this invention should be used in flow batteries in a pH≤13.5 to make sure that they undergo a minimal amount of degradation throughout cycling.

Example 5: Cycling Tests of Cells Comprising Compound of Formula (I) in Galvanostatic Mode The electrochemical diagnosis of the compounds of formula (I) and of the comparative disubstituted compounds that was performed in diluted state in a standard three-electrode electrochemical cell was followed by an evaluation in concentrated state ≥0.2 M) where most secondary reactions linked to the redox active degradation are likely to occur.

General procedure: Cell tests were carried out on a BCS-815 battery cycler (Biologic) at room temperature. The redox flow battery cell was composed of an Aquivion® membrane (E98-09S Solvay) with an 80 μm thickness serving as separator sandwiched between two GFD porous graphite felts (SGL Carbon group, GFD 4.6 EA), 4.6 mm thick with an active area of 5 or 25 cm$^2$. The electrodes were inserted into 3 mm PVC frames surrounded by EPDM gaskets. The current collectors were made of graphite composite material provided by SGL and the assembly was compressed by two PVC end-plates. The electrolytes were pumped within the cells through remote-control diaphragm liquid dosing pumps (KNF) at a flow rate of 50 mL/min. The tanks were made of polyethylene connected to polyurethane tubing (4 mm inner diameter). Before each test, the cell materials (membrane and electrodes) were carefully rinsed by using 100 mL of distilled water in each tank that circulates into the cell for one hour. The cell, the process and the tanks were air purged and another rinsing step were performed for one hour before air-purging the whole system. The negolyte, which charged (reduced) form is sensitive to oxygen, was protected by an argon blanket atmosphere by bubbling the gas directly into the negolyte that was kept under circulation for 10 minutes.

Capacity utilization was calculated by determining the ratio of the discharge capacity to the theoretical capacity available in the electrolytes. Coulombic efficiency was calculated by determining the ratio of the discharge capacity to the charge capacity. Energy efficiency was calculated by determining the ratio of the discharge energy to the charge energy. The energy density was calculated by determining the ratio of the discharge energy to the total volume of posolyte (positive electrolyte) and negolyte (negative electrolyte).

Under galvanostatic mode, the standard operating current density used was 40 mA/cm$^2$.

5.1. Cell Comprising Compound D4CH (Comparative)

Figure 5:
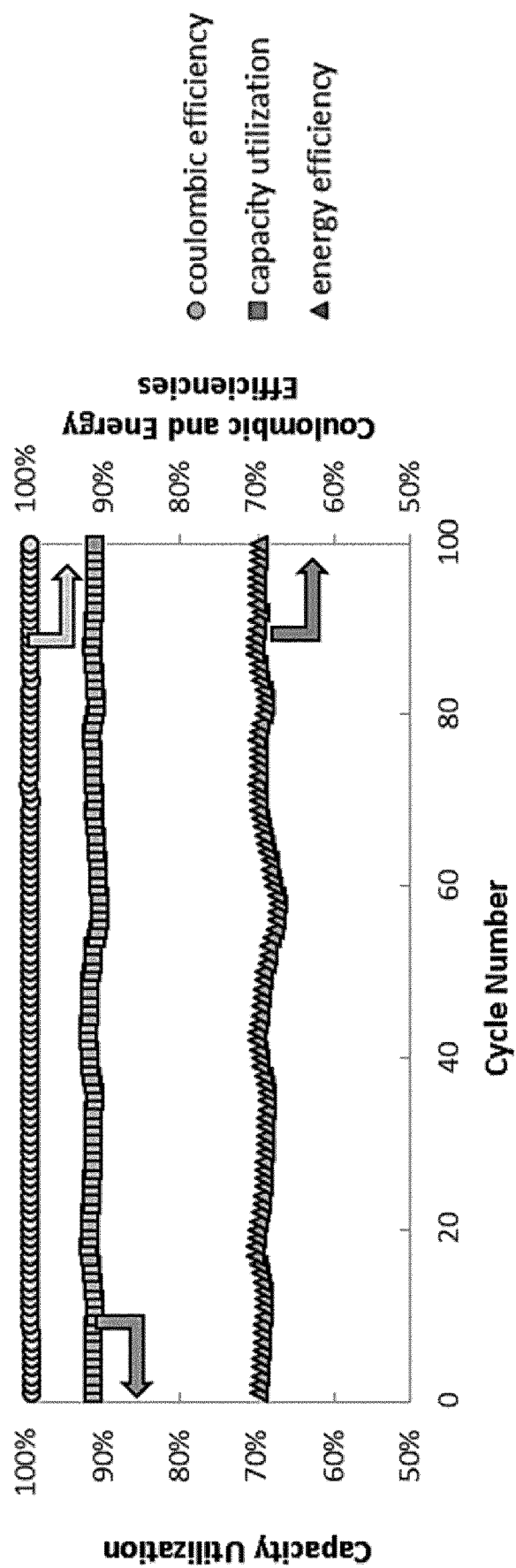
FIG. 5 is a graph representing the capacity utilization, coulombic and energy efficiencies of a cell test involving a negolyte with compound D4CH

Test parameters:
 Active area: 5 cm$^2$
 Negative pole: 10 mL of negolyte comprising 0.2 M of D4CH and 1 M of KOH
 Positive pole: 15 mL of posolyte comprising 0.5 M potassium ferrocyanide and 0.1 M KOH
 Averaged pH: 13.5
 Cycling test: galvanostatic mode, current of 0.2 A, 1,000 cycles over 2 months of cycling operation
 Voltage limits: between 0.55 and 1.35 V.
 FIG. 5 shows the first one hundred cycles recorded.

An important available capacity (capacity utilization) of 91% was reached (theoretical capacity=107 mAh) whereas very high capacity retention was achieved, reaching 99.995% per cycle (4,000 cycles before losing 20% of initial capacity). The energy efficiency recorded stayed constant at 70% whereas the averaged coulombic efficiency of 99.5% signified that a small proportion of unwanted secondary reactions occurred during the test.

Such low energy efficiency is recorded throughout the cycling test. This parameter is directly correlated to the overall cell resistance which has a direct influence on the charge and discharge voltage deviation during the cycling operation. The cell resistance includes multifactorial contributions (Arenas et al. Journal of Energy Storage 11 (2017), pp. 119-153.), from namely i) reaction kinetics i.e. when at least one redox couple exhibits low electron transfer kinetics; ii) the membrane through ionic transfer limitations with low cations diffusion coefficients across the membrane (increases with the membrane thickness) i.e. K$^+$ has a lower one compared to Na$^+$ one across Nafion-type membrane; iii) the porous electrode; iv) mass transport limitation i.e. at low electrolyte flow rate; v) electrical contacts coming from i.e. a poor cell design with solid/solid ohmic losses and/or improper voltage terminal connections.

All parameters are almost equal for each described cell tests of this invention apart from the reaction kinetics which are lower for disubstituted compounds compared to monosubstituted ones at pH lower than 14 (see cyclic voltammetry at pH 13 and pH 14 (FIGS. 2 and 3), which is the case here. This result suggests that, in a stable environment, namely at a pH lower than 13.5, DxCx compounds exhibit low charge-transfer kinetics that decrease the energy efficiency of the cycling operation.

After this first cycling step of 100 cycles, some water-osmosis phenomenon occurred and prevented an optimal electrolyte circulation to be maintained, highlighting at the same time the difficulty to perform flow battery tests with low electrolyte volumes. Therefore, the cycling performances decreased, nevertheless a total of 1,000 cycles over 2 months were still able to be achieved.

Post-cycling analyses were carried out using $^1$H NMR spectroscopy electrolytes. No traces of compound D4CH degradation were visible in the negolyte analysis, showing that this compound exhibited very high chemical stability under cycling. Furthermore, the posolyte analysis showed no trace of anthraquinone moiety, unraveling the very slow diffusion coefficient of compound D4CH across Nafion-type membranes, and by extension of the other presented derivatives. Taking into account the electrolyte-membrane contact time during this cycling test and the NMR spectroscopy resolution, the permeability coefficient of compound D4CH can be estimated below 10$^{-12}$ cm$^2$/s or less than 1% capacity loss per year of electrolyte-membrane contact.

5.2. Cell Comprising Compound D4SH

Test parameters:
 Active area: 5 cm$^2$
 Negative pole: 9.5 mL of negolyte comprising 0.2 M of D4SH and 1 M of KOH
 Positive pole: 15 mL of posolyte comprising 0.5 M potassium ferrocyanide and 0.1 M KOH Averaged pH: 13.5

Cycling test: galvanostatic mode, current of 0.1 A, 2 cycles.

Voltage limits: between 0.65 and 1.28 V.

Figure 6:
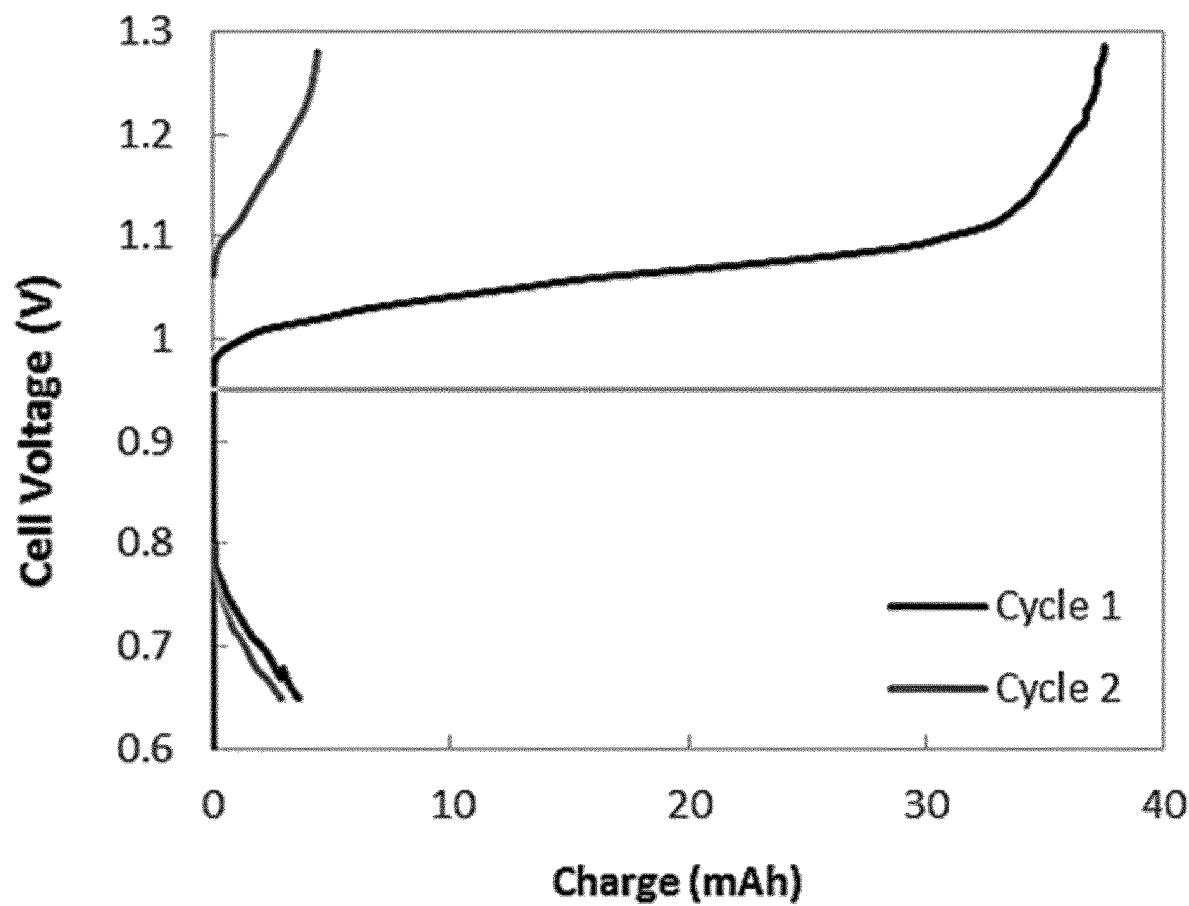
FIG. 6 is a graph representing two cycles of a cell test involving a negolyte with compound D4SH.

FIG. 6 shows the two recorded cycles.

The first charge allowed to reach only 34% of the available capacity (theoretical capacity=102 mAh) of which only 3.6 mAh were discharged (10% of the charged capacity). The second cycle did not exhibit much charged capacity (4.4 mAh).

The cycling test was stopped and the cell was opened. The analysis of the cell components disclosed the presence of organic materials that was clogging the negolyte electrode at the electrolyte inlet spot. This experimental result suggested that the solubility of D4SH compound was too low at charged state, and such property is not compatible with RFBs requirements.

5.3. Cell Comprising Compound M4SH

Test Parameters:

Active area: 5 cm$^2$

Negative pole: 10 mL of negolyte comprising 0.2 M of M4SH and 1 M of KOH

Positive pole: 15 mL of posolyte comprising 0.4 M potassium ferrocyanide and 0.1 M KOH Averaged pH: 13.5

Cycling test: galvanostatic mode, current of 0.2 A, 1,000 cycles over 2 months of cycling operation Voltage limits: between 0.65 and 1.28 V.

Figure 7:
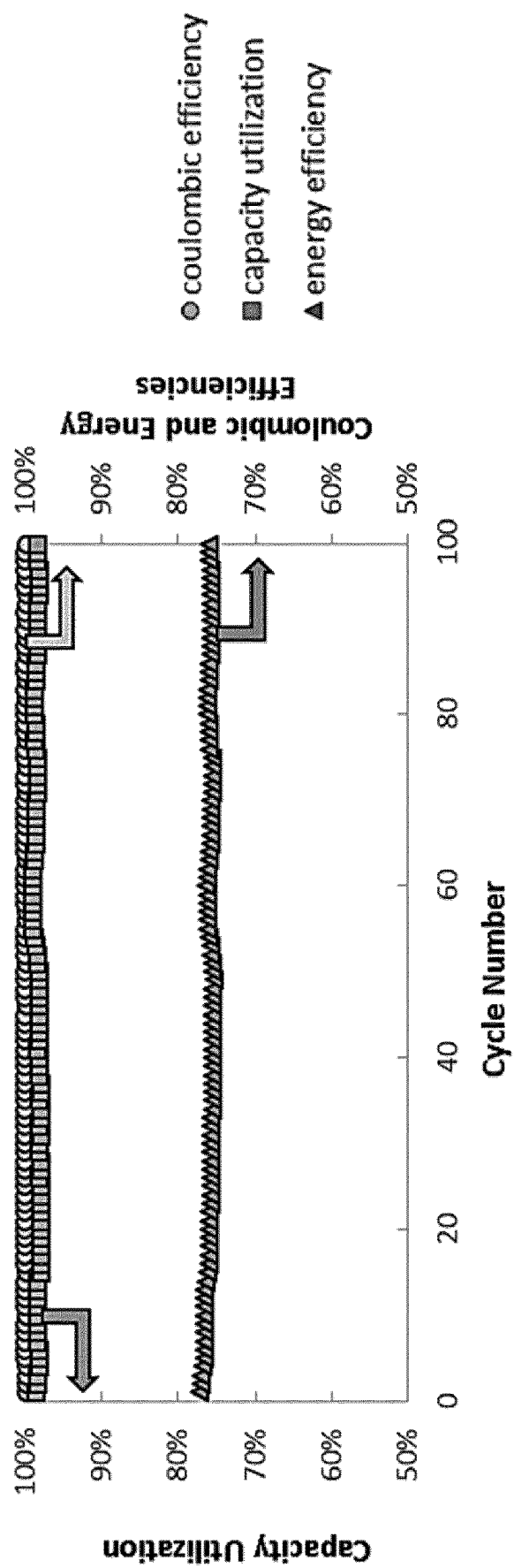
FIG. 7 is a graph representing the capacity utilization, coulombic and energy efficiencies of a cell test involving a negolyte with compound M4SH.

FIG. 7 shows the first one hundred cycles recorded.

A close to the theory (98%) available capacity was reached (theoretical capacity=107 mAh) whereas very high capacity retention was achieved, reaching 99.999% per cycle (20,000 cycles before losing 20% of initial capacity). The energy efficiency recorded stayed constant at 76% whereas the averaged coulombic efficiency of 99.9% signified that a very low proportion of unwanted secondary reactions occurred during the test.

After this first cycling step of 100 cycles, some water-osmosis phenomenon occurred and prevented an optimal electrolyte circulation to be maintained, highlighting at the same time the difficulty to perform flow battery tests with low electrolyte volumes. Therefore, the cycling performances decreased, nevertheless a total of 1,000 cycles over 2 months were still able to be achieved.

Post-cycling analyses were carried out using $^1$H NMR spectroscopy electrolytes. In addition, no traces of compound M4SH degradation were visible, showing that this compound exhibited very high chemical stability under cycling. Furthermore, the posolyte analysis showed no trace of anthraquinone moiety, unraveling the very slow diffusion coefficient of compound M4SH across Nafion-type membranes, and by extension of the other presented derivatives. Taking into account the electrolyte-membrane contact time during this cycling test and the NMR spectroscopy resolution, the permeability coefficient of compound M4SH can be estimated below $10^{-12}$ cm$^2$/s or less than 1% capacity loss per year of electrolyte-membrane contact.

5.4. Cell Comprising Compound M3CH a) Test 1

Test Parameters

Active area: 25 cm$^2$

Negative pole: 30 mL of negolyte comprising 0.5 M of M3CH, 0.6 M of KOH, 0.3 M NaOH and 0.8 M KCl Positive pole: 40 mL of posolyte comprising 0.6 M potassium ferrocyanide and 0.3 M NaOH Averaged pH: 13.0

Cycling test: galvanostatic mode, current of 1 A, 85 cycles over 2 months of cycling operation Voltage limits: between 0.5 and 1.30 V.

Figure 8:
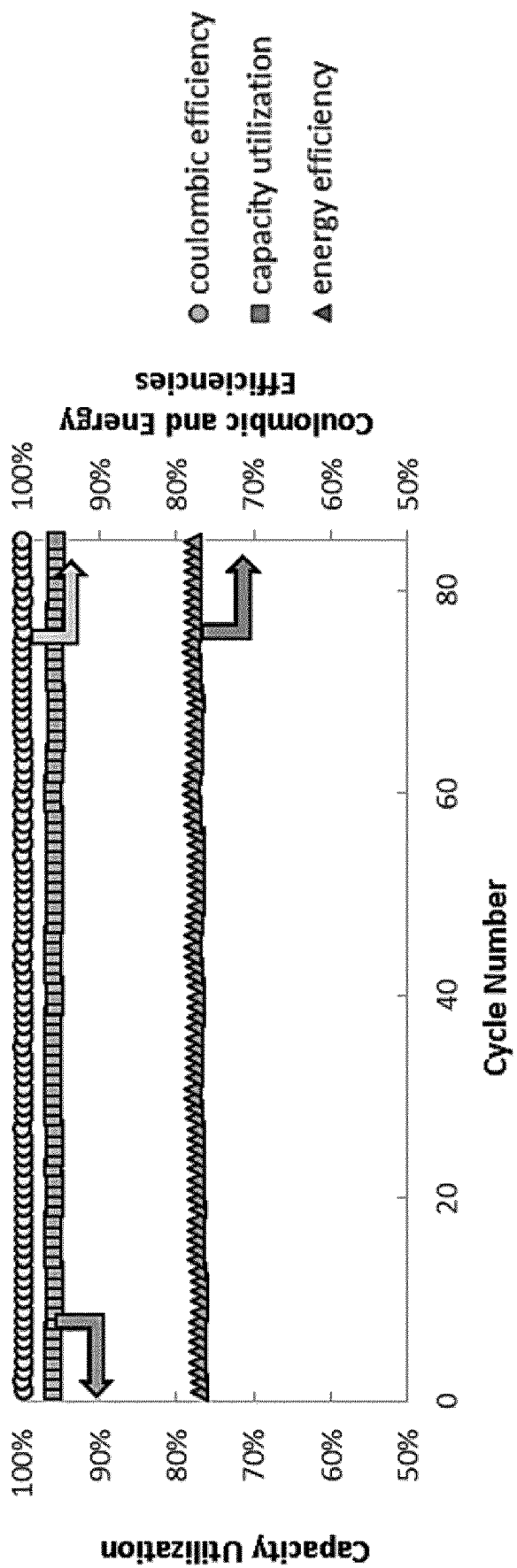
FIG. 8 is a graph representing the capacity utilization, coulombic and energy efficiencies of a cell test involving a negolyte with compound M3CH.

FIG. 8 shows the 85 cycles recorded.

Figure 9:
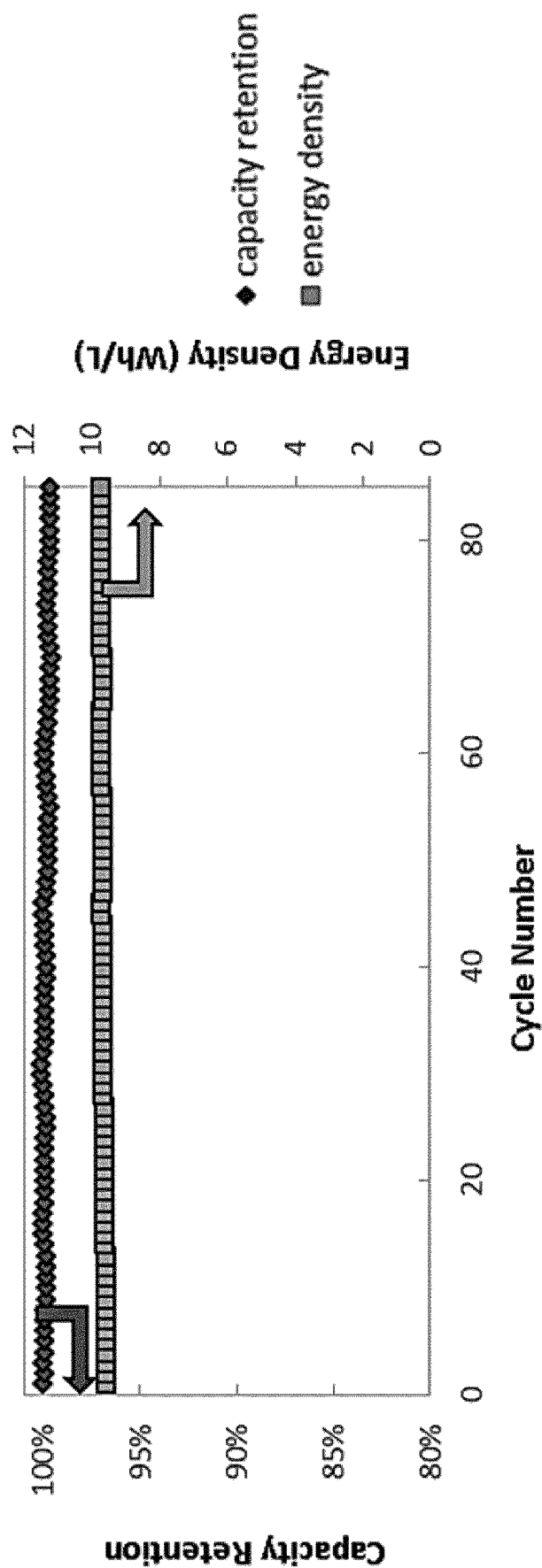
FIG. 9 is a graph representing the capacity utilization and energy density exhibited by a cell test using a negolyte containing compound M3CH.

A high available capacity of 96% was reached (theoretical capacity=804 mAh). It is to be noted that a concentration of 0.5 M (1 M electron) of compound M3CH was used in the negolyte for this cycling test despite the fact that a maximum of 0.53 M of concentration was evaluated at pH 14 for this compound. The available capacity and the energy density reached during this test (close to 10 Wh/L) show that compound M3CH is soluble at every state-of-charge (FIG. 9). Furthermore, a very high capacity retention was achieved, reaching 99.99945% per cycle (36,363 cycles before losing 20% of initial capacity). The energy efficiency recorded stayed constant at 78% whereas the averaged coulombic efficiency of 99.8% signified that a very low proportion of unwanted secondary reactions occurred during the cycling operation.

b) Test 2

Test Parameters:

Active area: 25 cm$^2$

Negative pole: 60 mL of negolyte comprising 0.5 M of compound M3CH, 0.6 M of KOH, 0.3 M NaOH and 0.4 M KCl Positive pole: 110 mL of posolyte comprising 0.6 M potassium ferrocyanide and 0.3 M NaOH Averaged pH: 13.0

Cycling test: galvanostatic mode, current of 1 A

Voltage limits: between 0.6 and 1.35 V.

At the end of charge, a rest of 24 hours at ocv was added before each discharge, allowing to quantify the self-discharge of this system in conditions close to its future application. The cycling test was performed during 7 cycles.

Figure 10:
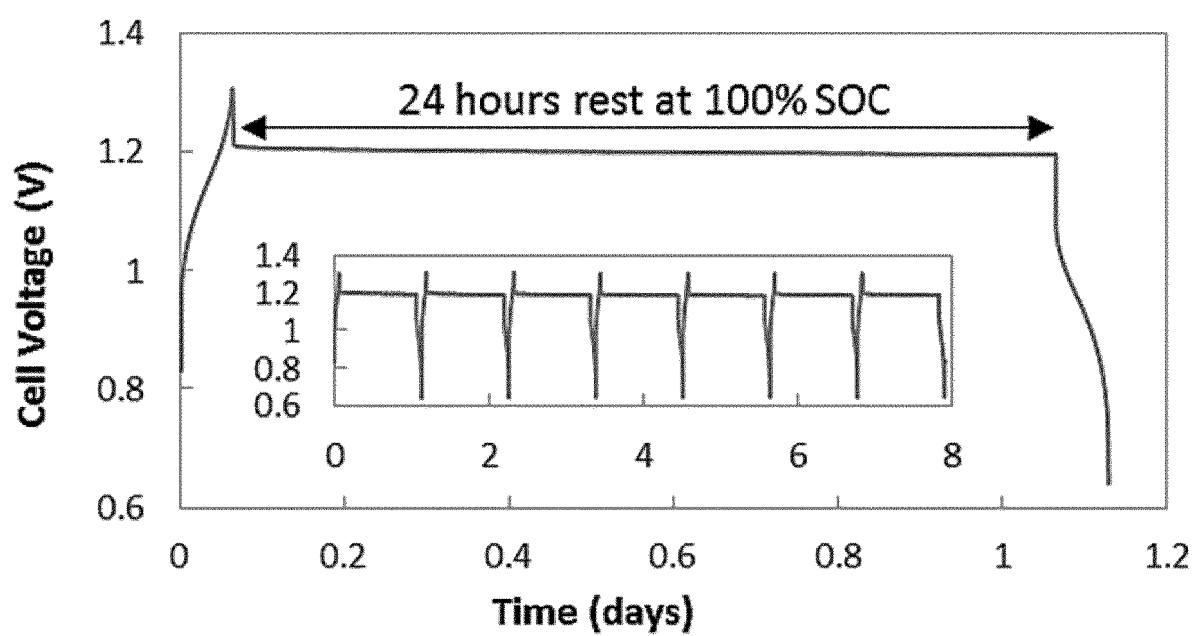
FIG. 10 is a graph representing the cell voltage versus time of a typical galvanostatic cycle with 24 hours of rest after full charge along with (insert) the full cycling test involving 7 cycles and 7 rest steps.
Figure 11:
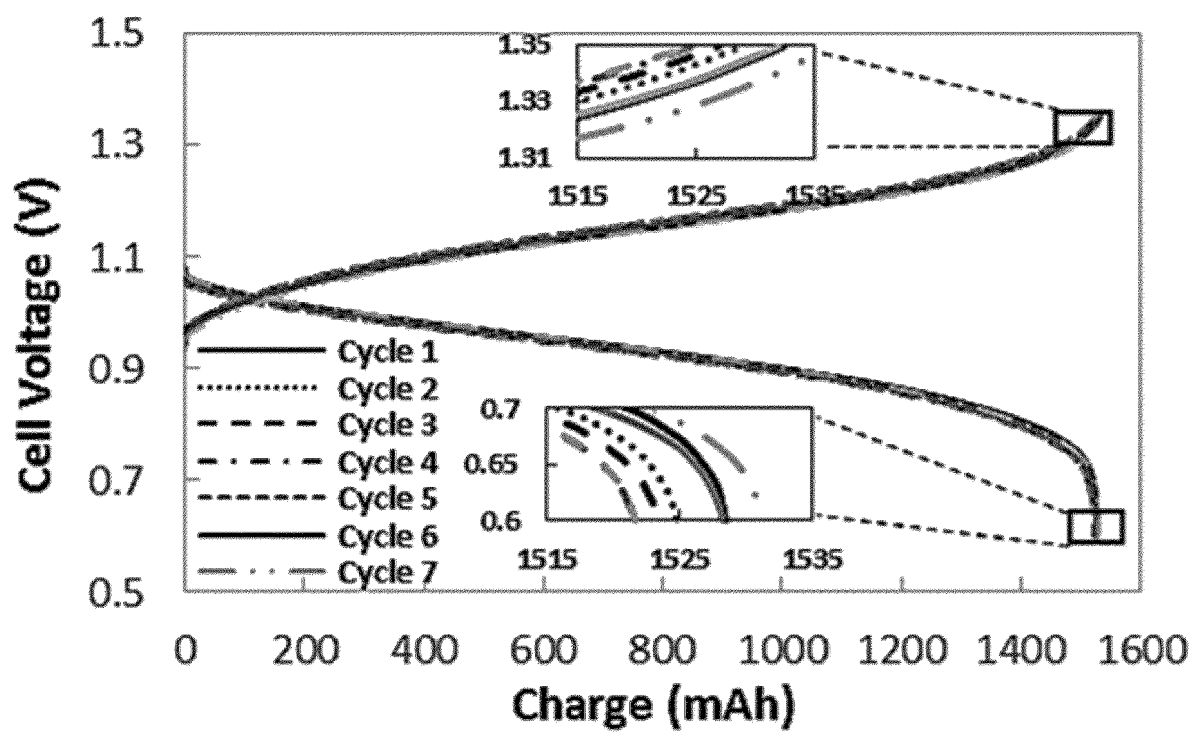
FIG. 11 is a graph representing the cell voltage versus charge and discharge capacities of 7 cycles involving galvanostatic charge +24 hours of rest and galvanostatic discharge.

The charge and discharge capacities were plotted in FIG. 10. A high available capacity of 92% (1.13 hours of storage) was reached (theoretical capacity=1,608 mAh). Coulombic efficiencies (CE) after 7 cycles and 1 day of rest after each full charge varied from 99.67 up to 99.83% with an average of 99.76%, compared to the average CE of 99.95% during constant cycling. The self-discharge is thus estimated to be close to 0.19% per storage day, which is a semi-decade lower than the expected limit 1% per day). Furthermore, a very high capacity retention was achieved (FIG. 11), reaching>99.9999% per cycle (200,000 cycles before losing 20% of initial capacity). The energy efficiency recorded stayed at 79%, which is close to the required level of 80% for full-size system.

Example 6: Cycling Tests of Cells Comprising Compound of Formula (I) in Constant Power Cycling Mode The standard flow rate of 2 mL/min/cm$^2$ (50 mL/min for a 25 cm$^2$ active area) used in most of the cell tests presented above is of the same order of magnitude as those used in the literature (from 4 to 12 mL/min/cm$^2$). This important flow rate allows limiting and neglecting mass transport losses in the end of charge and discharge, assuring that most of the capacity available in the electrolytes is available. This cycling procedure over a wide range of state-of-charge (typically between 2% and 98%) is not consistent with system conditions, as pumps power must be optimized in order to maximize the overall system yield.

In addition, galvanostatic mode is not used in RFB system, constant power cycling mode is more realistic to use when making estimations for systems with switch-mode power supplies.

In the purpose of getting closer to real system conditions, another cell test was performed in constant power cycling mode and the electrolytes were pumped inside the cell at a flow rate of 0.5 mL/min/cm$^2$ (12 mL/min). A lower flow rate combined with a discharge in constant power cycling mode will necessarily imply a capacity loss due to mass-transport limitations.

This cell test was performed using materials described above and with the following parameters:
Active area: 25 cm$^2$
Negative pole: 370 mL of negolyte comprising 0.3 M of compound M3CH, 0.6 M of KOH and 0.3 M NaOH
Positive pole: 488 mL of posolyte comprising 0.5 M potassium ferrocyanide and 0.3 M NaOH
Averaged pH: 13.5
Cycling test: constant power cycling mode, power of 1 W
Voltage limits: between 0.7 and 1.25 V.

Figure 12:
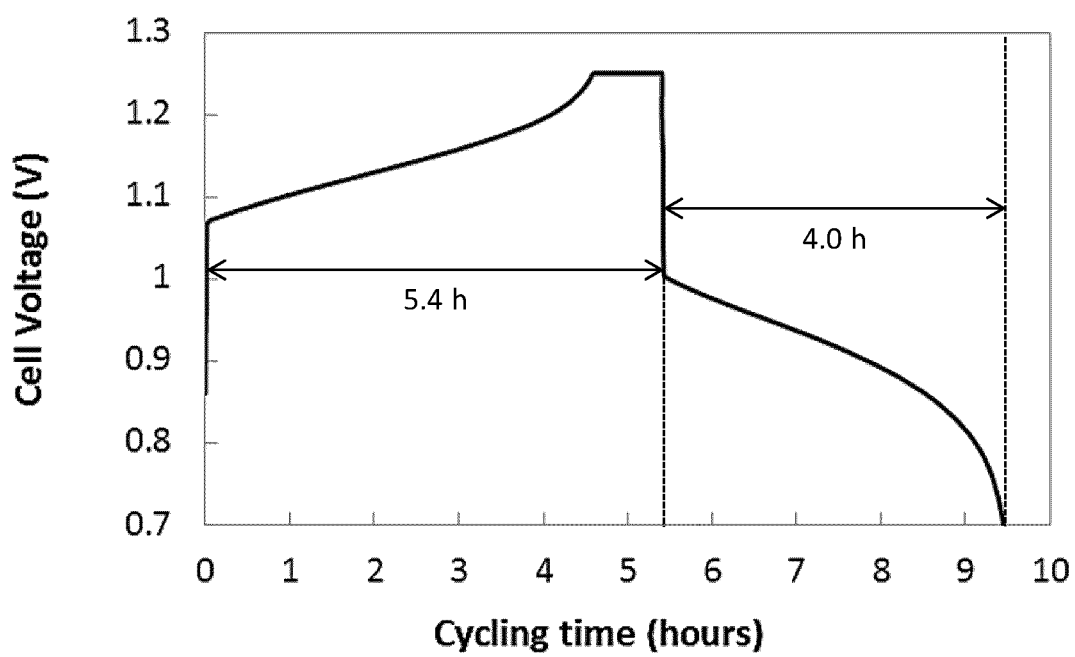
FIG. 12 is a graph representing the second cycle performed in constant power cycling mode (1 W) with a CV step at the end of charge (limited to 0.25 W) of a cell test involving a negolyte with compound M3CH.

At the end of charge, a CV step was performed at 1.25 V with until 0.25 W limit is reached. Such electrolyte volume represents a storage capacity of 4 hours (FIG. 12), it is to be noted that such storage capacities have never been demonstrated to date in the AORFB field.

Figure 13:
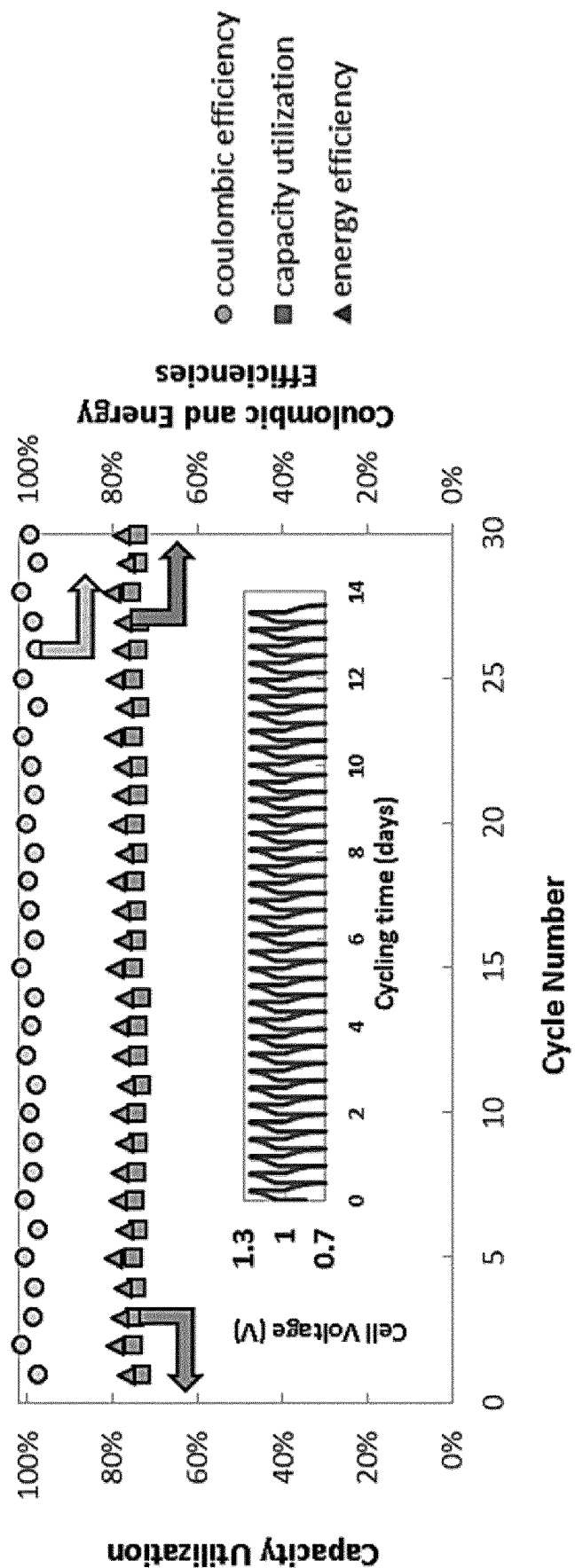
FIG. 13 is a graph representing the capacity utilization, coulombic and energy efficiencies of a cell test involving a negolyte with compound M3CH and (insert) plotting of the cell voltage as a function of cycling time.

The cycling test was performed during 30 cycles over 14 days of cycling operation (FIG. 13).

Figure 14:
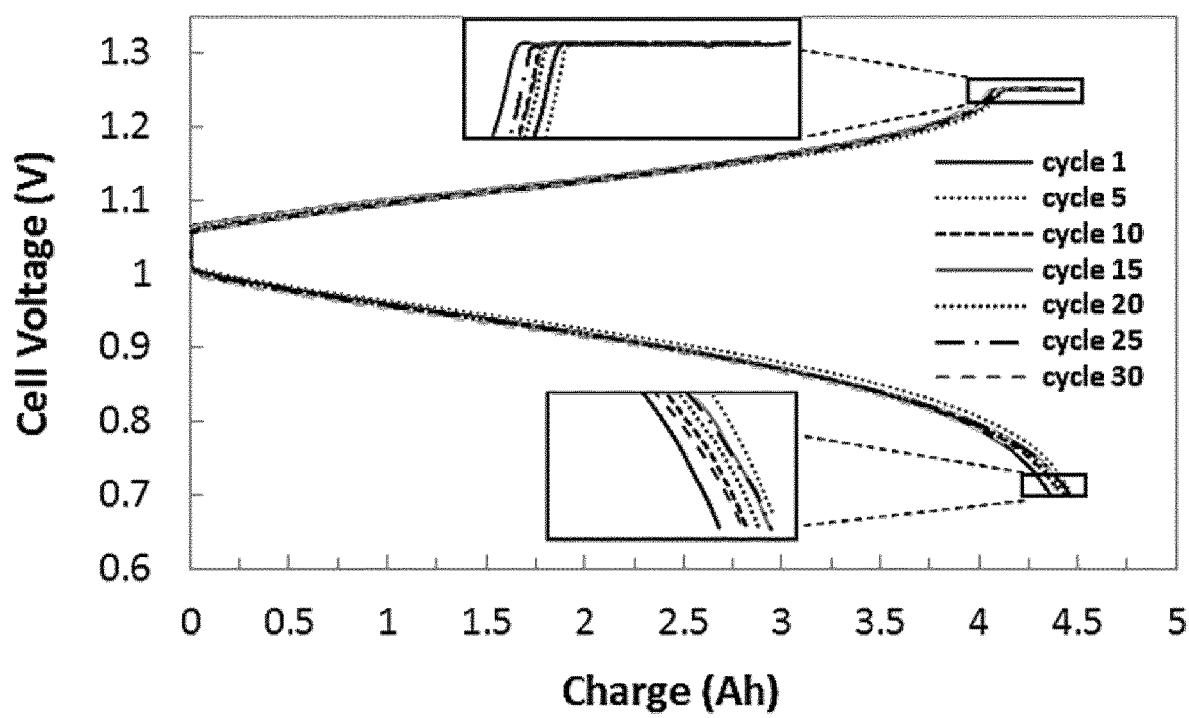
FIG. 14 is a graph representing the cell voltage versus charge recorded for 30 cycles performed in constant power cycling mode of a cell test involving a negolyte with compound M3CH.

As stated before, a lower available capacity was reached (74%) due to mass transport limitations (theoretical capacity=5.95 Ah) whereas very high capacity retention was achieved (FIG. 14), reaching 99.99923% per cycle. Before losing 20% of initial capacity, such battery, after extrapolation, could perform 25 974 cycles or 32.3 years with an average of 2.1 cycles per day, which is, again, an unprecedented performance.

Such achievement shows that using compounds of formula (I) allows obtaining an AORFB that does not suffer from electrolyte degradation nor cross-over problematics. Hence, it can be envisaged that very few, if not none electrolyte replacement will be needed during all the battery operation (expected to last up to 20 years to justify its investment and utilization).

Figure 15:
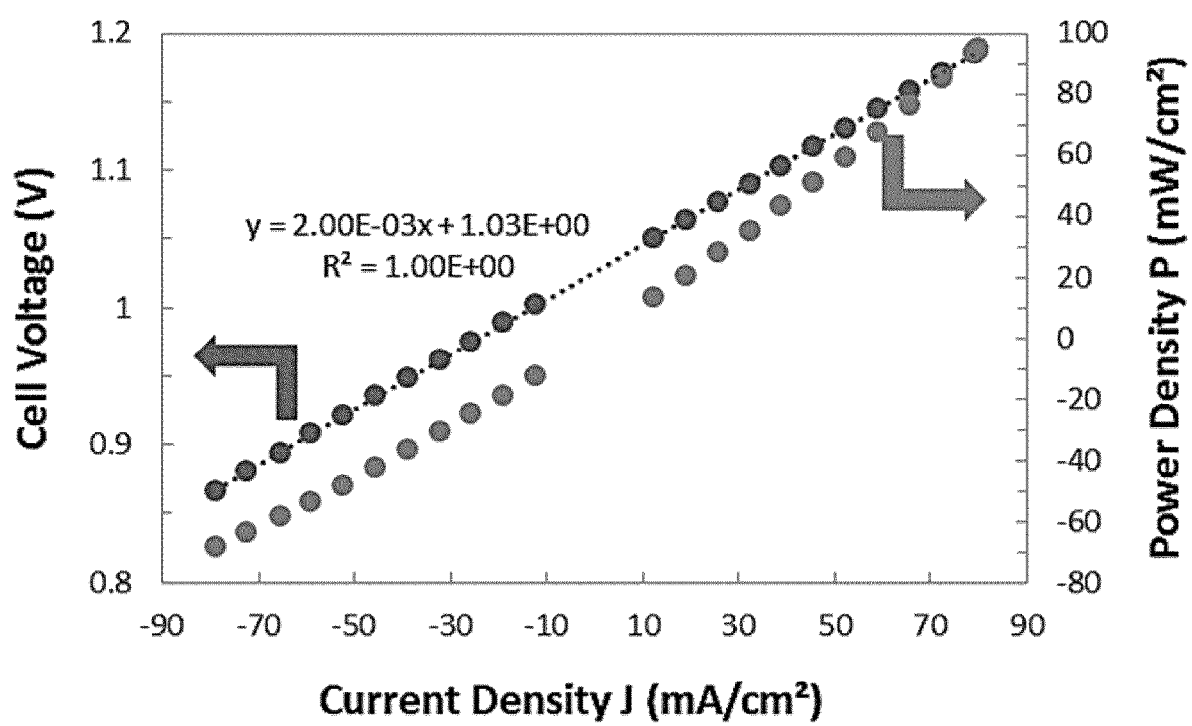
FIG. 15 is a graph representing the polarization curve realized at 50% SOC using a ramp of +100 A/min and −100 A/min of a cell test involving a negolyte with compound M3CH.

The energy efficiency recorded stayed constant at 78% whereas the averaged coulombic efficiency of 99.1% signified that a low proportion of unwanted secondary reactions occurred during the test. Furthermore, at 50% SOC, where the system does not suffer from charge-transfer or mass-transport limitations, a polarization curve was performed in charge and discharge using a ramp of 100 A/min and −100 A/min in order to evaluate the active surface resistance of the cell (FIG. 15).

A value of 20 Ω·cm$^2$ was obtained which is consistent with an electrochemical cell resistance comprising a Nafion-type membrane with a thickness of 80 μm which diffuses a majority of potassium cations (alkaline medium).

In addition, a power density of 70 mW·cm$^2$ was reached in discharge and a power density of 90 mW·cm$^2$ in charge, showing that higher nominal power densities could be used with such systems.

CONCLUSIVE REMARKS

The above results support that the technical effect provided by compound of formula (I) of the present invention was surprising and not obvious for a skilled person in the art.

Indeed, in prior art, redox anthraquinones are usually tested in symmetrical batteries (same electrolyte on each side, it is not a battery strictly speaking), which allows avoiding osmosis, electrolysis or electroosmosis issues. Then, redox anthraquinones are usually tested at a very high flow rate (around 12 mL/min/cm$^2$, for instance, versus lower than 1.3 in a real battery system), which allows optimizing the performances of the battery while hiding the solubility issues of the anthraquinone at different state of charge. Also, redox anthraquinones are usually tested in galvanostatic cycling (versus a constant power cycling in a real battery system) during low storage duration (<30 min). In addition, an excess of posolyte (in quantity of material and volume) is often used to optimize the performance of the negolyte (the degradation of the negolyte can be hidden by the excess posolyte if this degradation implies the formation of an electroactive species that can be charged and discharged in the same cycling potential window) and to optimize the performance of the battery in general by hiding unwanted secondary reactions such as electrolysis and air leak at the negative pole; ferricyanide and ferrocyanide cross-over from the positive to the negative pole.

On the contrary, according to the present invention, under near-real conditions (low flow rate, storage of 4 hours of energy, constant power cycling mode) and at pH 13.5, runs a redox flow battery with a degradation of 0.62% capacity per year (5 times more stable than values of prior art despite much more drastic conditions and more in line with the actual application).

In addition, the present invention provides an energy density close to 10 Wh/L (3 times higher than values of prior art).

Example 7: Cycling Tests of Cells Implementing Compounds of the Prior Art in Constant Power Cycling Mode Compounds ARS, AQ-2,7-DS and Complexone were tested as negolyte under near-actual operating conditions, i.e.:

Molar excess equivalents of the non-limiting side=10%.

Charge and discharge in constant power cycling mode. Constant cycling mode. No CV step at the end of the discharge.

Also, the effect of volume/storage duration on performances are disclosed. The higher the volume, the longer the storage duration.

Moreover, the effect of flowrate on performances are disclosed. System conditions impose a flowrate below 1 mL/min/cm$^2$.

These tested compounds were as follows:

ARS

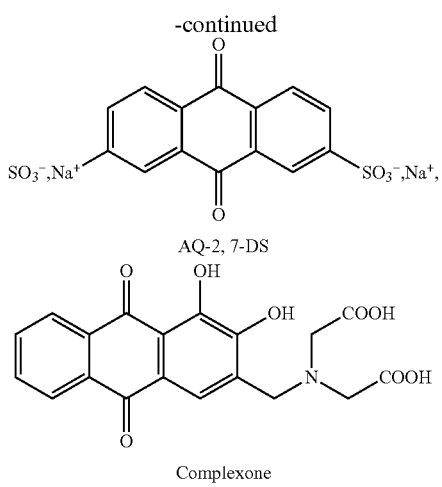

ARS: 1,2-Dihydroxyanthraquinone-3-sulfonic acid sodium salt (Alizarin Red S).

AQ-2,7-DS: Anthraquinone-2,7-disulfonic acid disodium salt.

Complexone: 3,4-Dihydroxyanthraquinon-2-yl-methyl-imino-diacetic acid.

To be considered as relevant for industrial applications under operating conditions, the battery comprising each negolyte should simultaneously fulfil the following parameters:

Energy density (considering both electrolytes volumes) under constant power cycling mode≥40 mW/cm$^2$ must be ≥4 Wh/L Storage duration (during discharge) under constant power cycling mode ≥40 mW/cm$^2$ must be ≥3 hours Stability (days before losing 20% of initial capacity) under constant power cycling mode ≥40 mW/cm$^2$ must be ≥365 days

7.1. Study of ARS Compound

Two different batteries comprising ARS as negolyte were tested under the same cycling parameters described above. The two batteries have the following parameters:

Active area: 25 cm$^2$
Negative pole: 0.2 M of ARS and 2M of KOH
Positive pole: 0.3 M potassium ferrocyanide and 1.4M of KOH
Averaged pH: 14.0
Cycling test: constant power cycling mode, power of 1 W. At the end of charge, a CV step was implemented at 1.3 V with until 0.25 W limit is reached.
Voltage limits: between 0.7 and 1.3 V.

Battery n°1:
Electrolyte volumes (V): 60 mL of negolyte and 88 mL of posolyte
Flowrate (Q): 5 mL/min/cm$^2$ (non-limiting, ideal conditions) during 1.9 days of constant cycling and, afterwards the flowrate is decreased down to 0.5 mL/min/cm$^2$ (limiting, system conditions)

Battery n°2:
Electrolyte volumes (V): 120 mL of negolyte and 176 mL of posolyte
Flowrate (Q): 5 mL/min/cm$^2$ (non-limiting, ideal conditions) during 3.8 days of constant cycling and, afterwards the flowrate is decreased down to 0.5 mL/in/cm$^2$ (limiting, system conditions).

The results of the cycling tests are gathered in the following table 8.

TABLE 8

Comparison of performances over 30 cycles (c) of batteries 1 and 2 which comprises 60 mL (1$^{st}$ battery) or 120 mL (2$^{nd}$ battery) of ARS; each battery was cycled using

| | Battery test number | | | |
|---|---|---|---|---|
| | Battery no 1 | Battery no 2 | Battery no 1 | Battery no 2 |
| Volume (mL)/Flowrate (mL/min/cm$^2$) | 60/5 | 120/5 | 60/0.5 | 120/0.5 |
| Energy Density after 30 c at 40 mW/cm$^2$ (Wh/L) | 3.2 | 3.5 | 2.5 | 2.2 |
| Average CE over 30 c (%) | 98.79% | 98.48% | 98.79% | 98.56% |
| Storage duration of the 1st cycle at 40 mW/cm$^2$ (hours) | 0.50 | 1.16 | 0.41 | 0.77 |
| Capacity retention after 30 c (%) | 95.27% | 89.82% | 92.06% | 86.22% |
| Capacity retention per cycle over 30 c (%/cycle) | 99.84% | 99.64% | 99.72% | 99.51% |
| Stability in cycles (−20%) | 138 | 62 | 81 | 45 |
| Capacity retention per day over 30 c (%/day) | 96.57% | 96.68% | 93.87% | 94.34% |
| Stability in days (−20%) | 6.4 | 6.6 | 3.5 | 3.8 | two different flowrates (5 and 0.5 mL/min/cm$^2$). The energy density considers both electrolyte volumes; the coulombic efficiency (CE) is averaged over the 30 cycles; the storage duration (discharge process expressed in hours) of the 1st cycle is represented; the capacity retention (%) after 30 cycles is shown; the capacity retention is either expressed by percentage of capacity loss per cycle (%/cycle) either per day of constant cycling (%/day); the stability expressed the extrapolation of the number of cycles or days of constant cycling before losing 20% of initial capacity.

Using constraints close to real systems, i.e. actual operating conditions (higher storage duration or volume, lower flowrate), the performances of ARS, an anthraquinone derivative which the structure involves a combination of hydroxy and sulfonate groups, are very low in terms of stability (a few days of constant cycling before losing 20% of capacity) and coulombic efficiency (<99%). These results point out that this anthraquinone undergoes degradation throughout cycling. In addition, it can be noticed that the stability depends on the time of cycling and on the flowrate (see stability in days of cycling shown in Table 8) but not on the volume of electrolyte. The degradation rate seems to be lowered (about twice as slow with higher flowrate) when non-limiting flowrate is implemented, suggesting that, for instance, better fluid homogeneity in the electrode lowers the chance of local voltage discrepancies leading to the anthraquinone chemical modification.

In conclusion, using ARS, under this battery environment and cycling conditions, is not suitable for the application under actual operating conditions. In particular, a battery implementing ARS does not fulfil the fixed key parameters of energy density; storage duration and stability. On the contrary compounds of formula (I) and batteries according to the present invention meet such key parameters of energy density; storage duration and stability simultaneously.

7.2. Study of AQ-2, 7-DS Compound

Two different batteries comprising AQ-2,7-DS as negolyte were tested under the same cycling parameters described above.

The two batteries have the following parameters:
Active area: 25 cm$^2$
Negative pole: 0.3 M of AQ-2,7-DS, 0.4M of KCl and 0.1M of KOH
Positive pole: 0.5 M potassium ferrocyanide and 0.1M of KOH
Averaged pH: 13.0
Cycling test: constant power cycling mode, power of 1 W. At the end of charge, a CV step was performed at 1.0 V with until 0.25 W limit is reached.
Voltage limits: between 0.5 and 1.0 V.
Battery n°3:
Electrolyte volumes (V): 60 mL of negolyte and 79 mL of posolyte
Flowrate (Q): 5 mL/min/cm$^2$ (non-limiting, ideal conditions) during 1.8 days of constant cycling and, afterwards the flowrate is decreased down to 0.5 mUmin/cm$^2$ (limiting, system conditions)
Battery n°4:
Electrolyte volumes (V): 120 mL of negolyte and 176 mL of posolyte
Flowrate (Q): 5 mL/min/cm$^2$ (non-limiting, ideal conditions) during 4.2 days of constant cycling and, afterwards the flowrate is decreased down to 0.5 mUmin/cm$^2$ (limiting, system conditions).
The results of the cycling tests are gathered in the following table 9.

TABLE 9

Comparison of performances over 30 cycles (c) of batteries 3 and 4 which comprises 60 mL (3rd battery) or 120 mL (4th battery) of AQ-2,7-DS; each battery was cycled using two different flowrates (5 and 0.5 mL/min/cm$^2$). The energy density considers both electrolytevolumes; the coulombic efficiency (CE) is averaged over the 30 cycles; the storage duration (discharge process expressed in hours) of the 1st cycle is represented; the capacity retention (%) after 30 cycles is shown; the capacity retention is either expressed by percentage of capacity loss per cycle (%/cycle) either per day of constant cycling (%/day); the stability expressed the extrapolation of the number of cycles or days of constant cycling before losing 20% of initial capacity.

| | Battery test number | | | |
|---|---|---|---|---|
| | Battery no 3 | Battery no 4 | Battery no 3 | Battery no 4 |
| Volume (mL)/Flowrate (mL/min/cm$^2$) | 60/5 | 120/5 | 60/0.5 | 120/0.5 |
| Energy Density after 30 c at 40 mW/cm$^2$ (Wh/L) | 4.0 | 4.1 | 2.9 | 0.0 |
| Average CE over 30 c (%) | 99.31% | 99.31% | 99.46% | 0.00% |
| Storage duration of the 1st cycle at 40 mW/cm$^2$ (hours) | 0.57 | 1.19 | 0.40 | 0.00 |
| Capacity retention after 30 c (%) | 98.24% | 96.19% | 98.82% | 0.00% |
| Capacity retention per cycle over 30 c (%/cycle) | 99.94% | 99.87% | 99.96% | 0.00% |
| Stability in cycles (−20%) | 378 | 173 | 563 | 0 |
| Capacity retention per day per day over 30 c (%/day) | 98.95% | 98.87% | 99.18% | 0.00% |
| Stability in days (−20%) | 21.1 | 19.6 | 27.1 | 0.0 |

The electrolytes have been formulated so as to adapt AQ-2,7-DS to the alkaline medium. Using low constraints (high flowrate, low volume), such anthraquinone derivative which structure involves two sulfonate groups exhibit a good energy density (>4 Wh/L) but the storage duration and the stability remain too low. Using constraints close to real systems (higher storage duration or volume, lower flowrate), the AQ-2,7-DS precipitates directly after decreasing the flowrate down to 0.5 mL/min/cm$^2$. This brutal result highlights the important impact of the flowrate on the apparent battery performances.

In conclusion, this active material, under this battery environment and cycling conditions, does not fulfil the key requirements for working under actual operating conditions, i.e. the minimum performances in terms of energy density, storage duration and stability detailed in the introductive part of example 7.

7.3. Study of Complexone Compound

A battery comprising Complexone as negolyte were tested under the same cycling parameters described above.
This battery n°5 has the following parameters:
Active area: 25 cm$^2$
Negative pole: 40 mL comprising 0.3 M of Complexone and 1M of KOH
Positive pole: 66 mL comprising 0.4 M potassium ferrocyanide and 1M of KOH
Averaged pH: 13.7
Cycling test: constant power cycling mode, power of 1 W. At the end of charge, a CV step was performed at 1.3 V with until 0.25 W limit is reached.
Voltage limits: between 0.6 and 1.3 V.
Flowrate: 5 mL/min/cm$^2$ (non-limiting, ideal conditions) during 4.2 days of constant cycling and, afterwards the flowrate is decreased down to 0.5 mL/in/cm$^2$ (limiting, system conditions).
The results of the cycling tests are gathered in the following table 10.

TABLE 10

Comparison of performances over 30 cycles (c) of battery no 5 using two different flowrates (5 and 0.5 mL/min/cm$^2$). The energy density considers both electrolyte volumes; the coulombic efficiency (CE) is averaged over the 30 cycles; the storage duration (discharge process expressed in hours) of the 1st cycle is represented; the capacity retention (%) after 30 cycles is shown; the capacity retention is either expressed by percentage of capacity loss per cycle (%/cycle) either per day of constant cycling (%/day); the stability expressed the extrapolation of the number of cycles or days of constant cycling before losing 20% of initial capacity.

| | Battery test number | |
|---|---|---|
| | Battery no 5 | Battery no 5 |
| Volume (mL)/Flowrate (mL/min/cm$^2$) | 40/5 | 40/0.5 |
| Energy Density after 30 c at 40 mW/cm$^2$ (Wh/L) | 4.8 | 4.5 |
| Average CE over 30 c (%) | 98.7% | 98.88% |
| Storage duration of the 1st cycle at 40 mW/cm$^2$ (hours) | 0.54 | 0.53 |
| Capacity retention after 30 c (%) | 90.79% | 89.89% |
| Capacity retention per cycle over 30 c (%/cycle) | 99.68% | 99.65% |
| Stability in cycles (−20%) | 69 | 63 |
| Capacity retention per day over 30 c (%/day) | 93.72% | 93.28% |
| Stability in days (−20%) | 3.4 | 3.2 |

Using constraints close to real systems, i.e. actual operating conditions (higher storage duration or volume, lower flowrate), the performances of Complexone, an anthraquinone derivative which structure involves a combination of hydroxy and carboxylic groups attached to a tertiary amine, are good in terms of energy density ≥4.5 Wh/L) but are very low in terms of stability (a few days of constant cycling before losing 20% of capacity) and coulombic efficiency (<99%). These results point out that Complexone undergoes degradation throughout cycling. In addition, it can be noticed that the stability does not depend on the flowrate (see stability in days of cycling shown in Table 10).

In conclusion, this active material, under this battery environment and cycling conditions, does not fulfil the key requirements for working under actual operating conditions, i.e. the minimum performances in terms of energy density, storage duration and stability detailed in the introductive part of example 7.

7.4. Comparison of ARS, AQ-2, 7-DS and Complexone with a Compound of Formula (I) of the Invention (M3CH)

Performances are compared over 5 days of constant cycling, under constant power cycling mode.

ARS battery test, AQ-2,7-DS battery test and Complexone battery test are those described above in examples 7.1, 7.2 and 7.3.

M3CH battery test corresponds to the example n°6 of this application.

Figure 16:
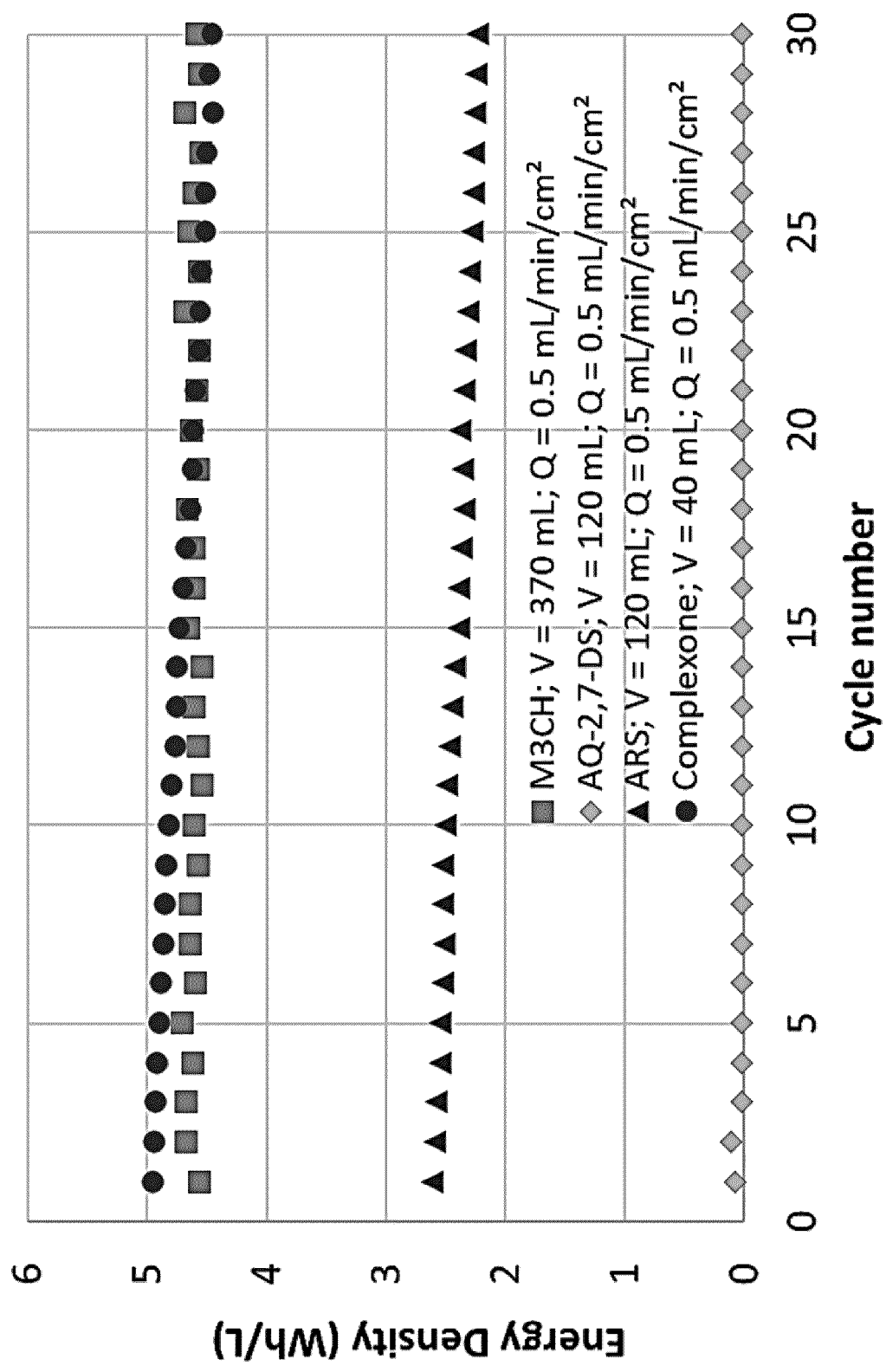
FIG. 16 is a graph representing the energy density of a battery comprising ARS, AQ-2,7-DS, Complexone or compound M3CH as negolyte, as a function of cycle number.
Figure 17:
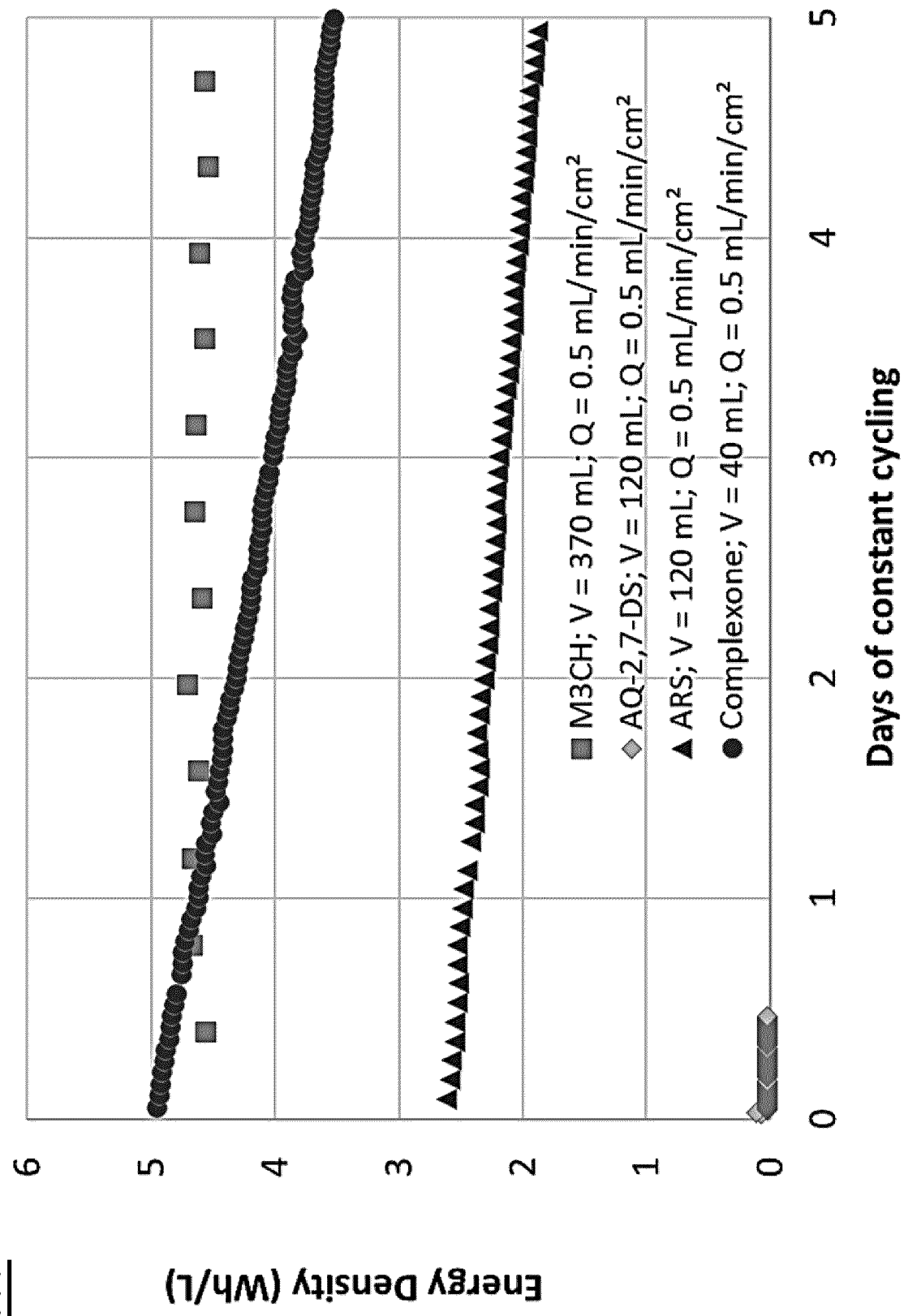
FIG. 17 is a graph representing the energy density of a battery comprising ARS, AQ-2,7-DS, Complexone or compound M3CH as negolyte, as a function of the days of constant cycling.

The comparison between these four systems are shown in FIGS. 16 and 17, and in Table 11.

TABLE 11

Comparison of performances over 5 days of constant cycling of four battery tests which negolyte comprises various active material; each battery used a specific negolyte volume; each battery used a flowrate of 0.5 mL/min/cm². The energy density considers both electrolyte volumes; the coulombic efficiency (CE) is averaged over the 30 cycles; the storage duration (discharge process expressed in hours) of the 1st cycle is represented; the capacity retention (%) after 30 cycles is shown; the capacity retention is either expressed by percentage of capacity loss per cycle (%/cycle) either per day of constant cycling (%/day); the stability expressed the extrapolation of the number of cycles or days of constant cycling before losing 20% of initial capacity.

|  | Battery test number/Example number | | | |
|---|---|---|---|---|
|  | Battery no 2/ Example 7.1 | Battery no 4/ Example 7.2 | Battery no 5/ Example 7.3 | Example 6 |
| Active molecule in the negolyte | ARS | AQ-2,7-DS | Complexone | M3CH |
| Volume (mL)/Flowrate (mL/min/cm²) | 120/0.5 | 120/0.5 | 40/0.5 | 370/0.5 |
| Energy Density after 5 days at 40 mW/cm² (Wh/L) | 1.9 | 0.0 | 3.5 | 4.6 |
| Average CE over 5 days (%) | 98.64% | 0 | 98.98% | 99.18% |
| Storage duration of the 1st cycle at 40 mW/cm² (hours) | 0.77 | 0 | 0.53 | 4.05 |
| Capacity retention after 5 days (%) | 72.9686% | 0% | 71.4600% | 99.9898% |
| Capacity retention per cycle over 5 days (%/cycle) | 99.5010% | 0% | 99.6977% | 99.9992% |
| Stability in cycles (−20%) | 45 | 0 | 74 | 28449 |
| Capacity retention per day over 5 days (%/day) | 93.8917% | 0% | 93.5002% | 99.9980% |
| Stability in days (−20%) | 3.5 | 0.0 | 3.3 | 10942.1 |

The comparison of the performances of different anthraquinone derivatives (ARS, AQ-2,7-DS, Complexone and M3CH), having very different water-solubilizing functions in alkaline medium have been performed using the same cycling conditions (the voltage limits have been optimized in each case considering the open-circuit voltage imposed by the studied anthraquinone/ferrocyanide redox couple) and using dedicated formulations.

The results show that only compounds according to the invention (here as illustrative purpose M3CH) allow obtaining a battery fulfilling the requirements in terms of energy density, storage duration and stability (i.e. an energy density greater than or equal to 4 Wh/L, a storage duration greater than or equal to 3 hours, and a stability greater than or equal to 365 days).

Thus, it is demonstrated that the anthraquinone compounds of the prior art do not provide sufficient performance under actual operating conditions as active material in the negolyte of an AORFB. On the contrary it has been demonstrated that a compound of formula (I) according to the invention allow operating an aqueous organic redox flow battery featuring very high performances in terms of energy density, storage duration and stability even under actual operating conditions.

The invention claimed is:

1. An aqueous electrolyte for a redox flow battery, comprising a compound of formula (I)

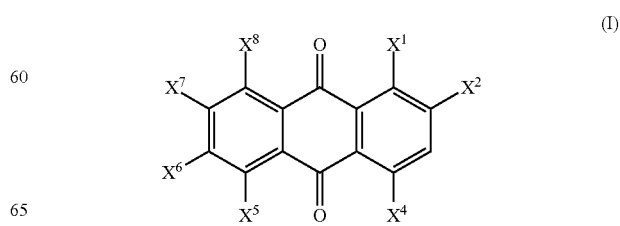

and/or an ion of compound (I),
and/or a salt of compound (I),
and/or a reduced form of the anthraquinone member of compound (I),
wherein:
X$^1$, X$^2$, X$^4$, X$^5$, X$^6$, X$^7$ and X$^8$ are each independently selected from the group consisting of a hydrogen atom, a halogen atom, an ether group of formula —O-A, a linear, cyclic or branched, saturated or unsaturated, optionally substituted, hydrocarbon group comprising from 1 to 10 carbon atoms, a OH group and a —O-A-R$^1$ group, A represents a linear, cyclic or branched, saturated or unsaturated, optionally substituted, hydrocarbon group comprising from 1 to 10 carbon atoms;

R$^1$ represents COOH or SO$_3$H;

wherein one and only one of X$^1$, X$^2$, X$^4$, X$^5$, X$^6$, X$^7$ and X$^8$ is OH, and wherein one and only one of X$^1$, X$^2$, X$^4$, X$^5$, X$^6$, X$^7$ and X$^8$ is —O-A-R$^1$.

2. The aqueous electrolyte according to claim 1, wherein the compound of formula (I) is selected from the group consisting of

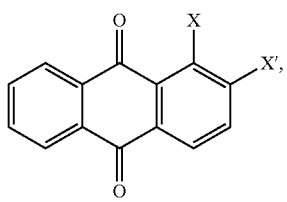
(I-1,2)

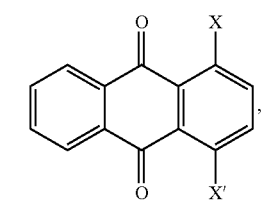
(I-1,4)

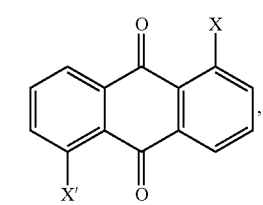
(I-1,5)

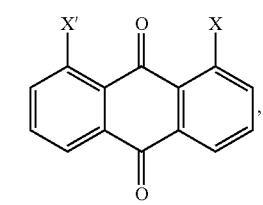
(I-1,8)

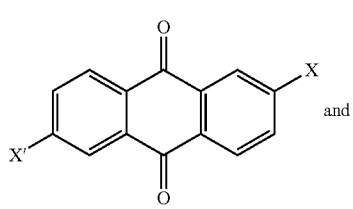
(I-2,6)
and

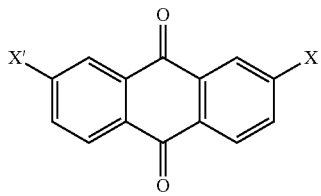
(I-2,7)

wherein:
if X=OH, X'=—O-A-R$^1$, and
if X=—O-A-R$^1$, X'=OH.

3. The aqueous electrolyte according to claim 1, wherein the compound of formula (I) is a compound of formula (I-1,4)

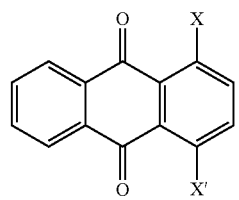
(I-1,4)

wherein X=—O-A-R$^1$ and X'=OH.

4. The aqueous electrolyte according to claim 1, wherein A represents (CH$_2$)$_n$, optionally substituted, wherein n is an integer selected from 1 to 10.

5. The aqueous electrolyte according to claim 1, wherein R$^1$ is selected from the group consisting of CO$_2$H, CO$_2$$^-$M$^+$, SO$_3$H and SO$_3$$^-$M$^+$, M$^+$ being selected from the group consisting of Li$^+$, Na$^+$, K$^+$ and NH$_4$$^+$.

6. The aqueous electrolyte according to claim 1, wherein A-R$^1$ is selected from the group consisting of —(CH$_2$)$_3$—COOH, —(CH$_2$)$_4$—COOH, —(CH$_2$)$_3$—SO$_3$H, —(CH$_2$)$_4$—SO$_3$H, —(CH$_2$)$_3$—SO$_3$$^-$$^+$Na and —(CH$_2$)$_4$—SO$_3$$^-$$^+$Na.

7. The aqueous electrolyte according to claim 1, wherein the compound of formula (I) is selected from the group consisting of

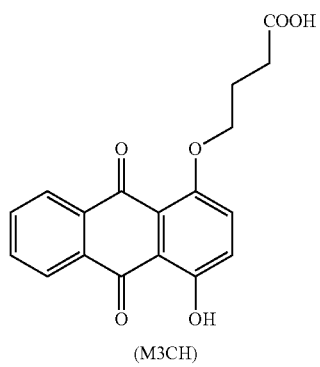
(M3CH)

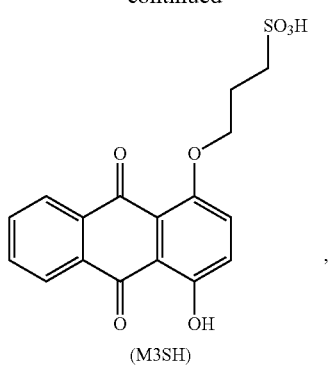

(M3SH)

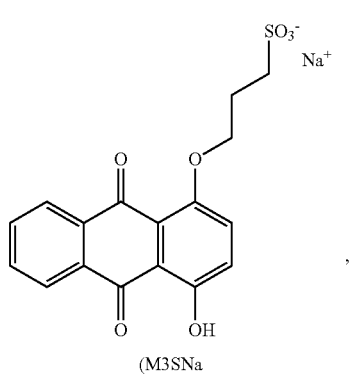

(M3SNa)

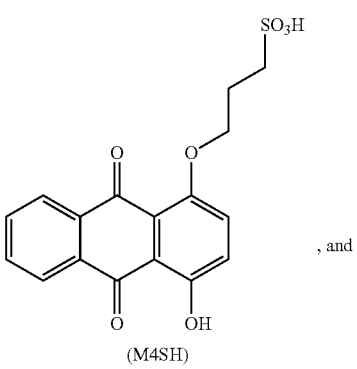

, and (M4SH)

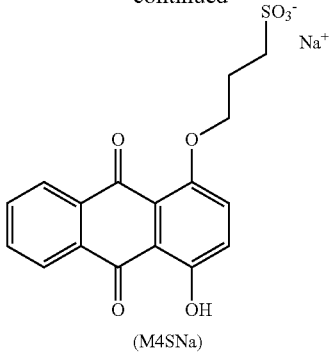

(M4SNa)

8. The aqueous electrolyte according to claim 1, wherein said electrolyte comprises at least one base.

9. The aqueous electrolyte according to claim 8, wherein the base comprises a hydroxide ion.

10. The aqueous electrolyte according to claim 8, wherein the base is at a concentration of 0.1 to 2 mol/L.

11. The aqueous electrolyte according to claim 1, wherein said electrolyte presents a pH superior or equal to 7 and inferior or equal to 13.5.

12. A redox flow battery comprising:
   a negative pole comprising an aqueous electrolyte according to claim 1, and
   a positive pole comprising a positive aqueous electrolyte.

13. A method for generating electricity by at least one redox flow battery, wherein the redox flow battery is defined according to claim 12.

14. The method according to claim 13, wherein said aqueous electrolyte and said positive aqueous electrolyte are pumped at a flow rate comprised between 0.1 and 1.3 mL/min/cm².

15. The aqueous electrolyte according to claim 1, wherein A represents $(CH_2)_n$, optionally substituted, wherein n is an integer selected from 2 to 5.

16. The aqueous electrolyte according to claim 1, wherein A represents $(CH_2)_n$, optionally substituted, wherein n is an integer selected from 3 to 4.

17. The aqueous electrolyte according to claim 1, wherein $R^1$ is selected from the group consisting of $CO_2H$, $CO_2^-M^+$, $SO_3H$ and $SO_3^-M^+$, and wherein $M^+$ is $Na^+$.

18. The aqueous electrolyte according to claim 7, wherein the compound of formula (I) is a compound of formula (M3CH).

19. The aqueous electrolyte according to claim 8, wherein the base is selected from the group consisting of potassium hydroxide, sodium hydroxide, lithium hydroxide, ammonium hydroxide, magnesium hydroxide, calcium hydroxide and any combination thereof.

20. The aqueous electrolyte according to claim 8, wherein the base is at a concentration of 0.3 to 1.5 mol/L.

* * * * *